(12) United States Patent
Heo et al.

(10) Patent No.: US 9,417,009 B2
(45) Date of Patent: Aug. 16, 2016

(54) CONTROLLING METHOD FOR A WASHING MACHINE

(71) Applicant: LG ELECTRONICS INC., Seoul (KR)

(72) Inventors: Seonil Heo, Changwon-si (KR);
Junseok Lee, Changwon-si (KR);
Woonje Choe, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 474 days.

(21) Appl. No.: 13/782,267

(22) Filed: Mar. 1, 2013

(65) Prior Publication Data

US 2013/0232813 A1    Sep. 12, 2013

(30) Foreign Application Priority Data

Mar. 6, 2012 (KR) .......................... 10-2012-0023031
Mar. 6, 2012 (KR) .......................... 10-2012-0023037

(51) Int. Cl.
| | |
|---|---|
| *F26B 3/00* | (2006.01) |
| *F26B 23/00* | (2006.01) |
| *D06F 58/28* | (2006.01) |
| *F26B 21/08* | (2006.01) |
| *F26B 21/10* | (2006.01) |

(Continued)

(52) U.S. Cl.
CPC .............. *F26B 23/001* (2013.01); *D06F 58/28* (2013.01); *F26B 21/086* (2013.01); *F26B 21/10* (2013.01); *D06F 58/206* (2013.01); *D06F 58/26* (2013.01); *D06F 2058/287* (2013.01); *D06F 2058/2854* (2013.01); *D06F 2058/2858* (2013.01); *D06F 2058/2893* (2013.01)

(58) Field of Classification Search
CPC .................. D06F 2058/287; D06F 2058/2874; D06F 2058/2893

USPC ................................. 34/467, 108, 73, 480, 82
See application file for complete search history.

(56) References Cited

U.S. PATENT DOCUMENTS 3,373,501 A * 3/1968 Worst .............................. 34/319
4,206,552 A * 6/1980 Pomerantz et al. ............. 34/445
(Continued)

FOREIGN PATENT DOCUMENTS

CN         1886628 A        12/2006
CN         1906451 A         1/2007
(Continued)

OTHER PUBLICATIONS

Chinese Notification of Divisional Application dated Nov. 15, 2014 issued in Application No. 201310070344.5 (with English translation).

(Continued)

*Primary Examiner* — Kenneth Rinehart
*Assistant Examiner* — John McCormack
(74) *Attorney, Agent, or Firm* — KED & Associates, LLP

(57) ABSTRACT

A control method for a drying machine according to one exemplary embodiment is applied to a drying machine which selects at least one of a heat pump system and a heater to use as a heat source for heating air to be supplied into the drum. The control method includes activating the heat pump system when both of the heat pump system and the heater are selected as the heat source, and determining whether or not a compressor included in the heat pump system normally operates. Whether or not to use the heater as the heat source is decided according to whether or not the compressor normally operates.

18 Claims, 24 Drawing Sheets

(51) Int. Cl.
*D06F 58/20* (2006.01)
*D06F 58/26* (2006.01)

(56) References Cited

U.S. PATENT DOCUMENTS

| | | | |
|---|---|---|---|
| 7,191,543 B2 * | 3/2007 | Yakumaru et al. | 34/77 |
| 8,353,114 B2 * | 1/2013 | Beers et al. | 34/343 |
| 8,387,272 B2 * | 3/2013 | Kim et al. | 34/524 |
| 2005/0217133 A1 | 10/2005 | Yakumaru et al. | 34/134 |
| 2010/0031953 A1 * | 2/2010 | Penev et al. | 126/615 |
| 2011/0005097 A1 | 1/2011 | Moon et al. | |
| 2012/0017464 A1 | 1/2012 | Beers et al. | 34/493 |

FOREIGN PATENT DOCUMENTS

| | | |
|---|---|---|
| CN | 101663433 A | 3/2010 |
| CN | 101939479 A | 1/2011 |
| CN | 102112678 A | 6/2011 |
| DE | 31 13 471 A1 | 10/1982 |
| DE | 43 30 456 C1 | 3/1995 |
| DE | 10 2007 016 078 A1 | 10/2008 |
| EP | 1 632 736 A2 | 3/2006 |
| EP | 2 058 427 A1 | 5/2009 |
| EP | 2 333 149 A1 | 6/2011 |
| WO | WO 2008/119608 A2 | 10/2008 |
| WO | WO 2012/134148 A2 | 10/2012 |

OTHER PUBLICATIONS

European Search Report dated Jul. 29, 2013 issued in Application No. 13 157 815.5.

Chinese Office Action dated May 6, 2015 issued in Application No. 201310070344.5.

* cited by examiner

CONTROLLING METHOD FOR A WASHING MACHINE

CROSS-REFERENCE TO RELATED APPLICATION

Pursuant to 35 U.S.C. §119(a), this application claims the benefits of earlier filing date and right of priority to Korean Application Nos. 10-2012-0023031 and 10-2012-0023037, filed on Mar. 6, 2012, the contents of which are incorporated by reference herein in their entireties.

BACKGROUND OF THE INVENTION

1. Field of the Invention

This specification relates to a method for controlling a drying machine (dryer) capable of drying clothes and the like, and more particularly, a method for controlling a drying machine capable of improving energy efficiency and reducing a drying time in a more efficient stable manner by selectively using at least one of a heat pump system and a heater as a heat source to heat up air, which is used for drying a target to be dried.

2. Background of the Invention

In general, a clothes treating apparatus having a drying function such as a washing machine or a drying machine (dryer) dries laundry (clothes) by putting the laundry, which are completely washed and dehydrated (spin-dried), into a drum, supplying hot air into the drum, and evaporating moisture of the laundry.

For example, a laundry drying machine includes a drum rotatably installed in a main body and receiving laundry therein, a driving motor to drive the drum, a blowing fan to blow air into the drum, and a heating unit to heat air introduced into the drum. The heating unit may use thermal energy generated using electric resistance or heat of combustion generated by burning gas.

In the meantime, the air discharged out of the drum of the drying machine contains moisture of the laundry filled in the drum so as to become hot and humid. Here, the drying machines are classified, according to how to process the hot humid air, into a circulating type drying machine, in which hot humid air circulates without being discharged out of the drying machine and is cooled below a dew point temperature through a heat exchanger such that moisture contained within the hot humid air can be condensed for resupply, and an exhaust type drying machine, in which hot humid air passed through the drum is discharged directly to the outside of the drying machine.

For the circulating type drying machine, in order to condense the air discharged out of the drum, the air has to be cooled below the dew point and then heated up by the heating unit prior to being resupplied into the drum. When a heater is used as the heating unit, a heat exchanger is separately needed to condense the hot humid air discharged from the drum, and thermal energy supplied by the heater is discharged to the outside due to heat exchange with the heat exchanger. The circulating type drying machine has an advantage of sufficiently supplying thermal energy needed by using the heater, but cause problems of lowering thermal efficiency and raising energy consumption. Also, for air circulation, since moisture has to be fully removed, the size of the heat exchanger or a drying time may increase.

Even for the exhaust type drying machine, after hot humid air is discharged to the outside, external air of room temperature has to be introduced and heated up to a required temperature through the heating unit. When a heater is used as the heating unit in the exhaust type drying machine, it has advantages in that any heat exchanger is not required separately and a drying time is reduced owing to fully supplying necessary thermal energy using the heater. However, air of high temperature is discharged directly to the outside with containing thermal energy transferred by the heating unit. This may result in lowered thermal efficiency and high energy consumption.

Therefore, in recent time, a drying machine capable of enhancing energy efficiency in a manner of restoring unused energy from air discharged out of a drum and using the restored air for heating air to be supplied into the drum has been introduced. One example of such drying machine is a drying machine having a heat pump system. The heat pump system includes two heat exchangers, a compressor and an expansion apparatus. Accordingly, a refrigerant circulating in a system adsorbs energy contained in hot air discharged and the adsorbed energy is used for heating air to be supplied into the drum. This may result in an increase in energy efficiency.

In detail, the heat pump system includes an evaporator disposed at an outlet side of the drum, and a condenser disposed at an inlet side of the drum. Accordingly, a refrigerant adsorbs thermal energy through the evaporator and is heated up to a state of high temperature and high pressure by the compressor. Afterwards, the thermal energy of the refrigerant is transferred to air introduced into the drum through the condenser. This may allow for generation of hot air by using dissipated energy with unused.

However, for the drying machine with the heat pump system, the system performance may depend on capacities of the evaporator for adsorbing thermal energy, the condenser for discharging energy and the compressor for compressing the refrigerant. Therefore, the heat pump system may be ideally designed to be suitable for thermal energy necessary, but in reality, the volumes and capacities of the compressor employed in the drying machine and the condenser and the evaporator as the heat exchangers may be merely limited. Therefore, when the heat pump system is used as a heating unit for heating air to be supplied into the drum, such drying machine has the advantage of superior energy efficiency, but has a problem in that the drying time increases due to the limit of the capacity of the heat pump system. Also, in view of the characteristic of the heat pump system, an overload may occur in the compressor and the like, and this may lower reliability of the heat pump system.

SUMMARY OF THE INVENTION

Therefore, an aspect of the detailed description is to provide a hybrid drying machine (dryer) capable of using both a heat pump system and a heater such that energy efficiency can be enhanced by using the heat pump system and a drying time can be reduced by additionally using the heater.

Another aspect of the detailed description is to provide a method for controlling a hybrid drying machine capable of improving reliability of a heat pump system by efficiently preventing an overload of a compressor, even with using both the heat pump system and a heater.

To achieve these and other advantages and in accordance with the purpose of this specification, as embodied and broadly described herein, there is provided a control method for a drying machine comprising a heat pump system and a heater as heat sources for heating air to be supplied into a drum, the heat pump system including a compressor, condenser, an evaporator and an expansion valve, the method including activating the heat pump system when simultaneous use of the heat pump system and the heat is decided, determining whether or not the compressor of the heat pump system normally operates, and deciding whether or not to use the heater according to whether or not the compressor normally operates.

Here, the heater may have a smaller heat supply capacity than the heat pump system.

The heater may be simultaneously activated when the compressor normally operates.

Here, the determining as to whether or not the compressor normally operates may include measuring a temperature variation of a refrigerant flowed through the compressor, and the compressor may be determined to normally operate when the temperature variation of the refrigerant is more than a preset reference temperature variation.

The control method may further include measuring the temperature of the refrigerant flowed through the compressor after the heater is activated, and activating or deactivating the heater according to the measured temperature of the refrigerant.

The activating or deactivating of the heater may include deactivating the heater when the temperature of the refrigerant measured while the heater is activated reaches the upper limit of a preset temperature range, measuring the temperature of the refrigerant flowed through the compressor while the heater is deactivated and determining whether or not the measured temperature is within the preset temperature range, and reactivating the heater when the temperature of the refrigerant measured while the heater is deactivated reaches the lower limit of the preset temperature range.

The drying machine may include a cooling fan to suck external air, and the control method may further include measuring the temperature of the refrigerant flowed through the compressor after the heater is activated, and activating or deactivating the cooling fan according to the measured temperature of the refrigerant.

Here, the activating or deactivating of the cooling fan may include activating the cooling fan when the temperature of the refrigerant measured while the heater is activated reaches the upper limit of a preset temperature range, measuring the temperature of the refrigerant flowed through the compressor while the cooling fan is activated and determining whether or not the measured temperature is within the preset temperature range, and deactivating the cooling fan when the temperature of the refrigerant measured while the cooling fan is activated reaches the lower limit of the preset temperature range.

The control method may further include measuring the temperature of a refrigerant flowed through the compressor after the heater is activated, and controlling the temperature of the refrigerant to be within an appropriate temperature range by controlling an open degree of the expansion valve of the heat pump system according to the measured temperature of the refrigerant.

Here, the controlling of the open degree of the expansion valve may include a primary valve control step of controlling the open degree of the expansion valve within a preset first open degree range, and a secondary valve control step of controlling the open degree of the expansion valve within a range larger than the first open degree range when the temperature of the refrigerant fails to belong to the appropriate temperature range even through the primary valve control step.

The control method may further include measuring the temperature of air supplied into the drum or the temperature of air discharged out of the drum when both of the heat pump system and the heater are decided to be used, activating or deactivating the heater according to whether or not the measured temperature of the air is within a preset temperature range, and using only the heat pump system as the heat source when the number of deactivation of the heater reaches a preset reference number of times.

The activating or deactivating of the heater may include deactivating the heater when the temperature of the air measured while the heater is activated reaches the upper limit of the temperature range, measuring the temperature of the air supplied into the drum or the temperature of the air discharged out of the drum while the heater is deactivated and determining whether or not the measured temperature is within the temperature range, and reactivating the heater when the temperature of the air measured while the heater is deactivated reaches the lower limit of the temperature range.

Only the heat pump system may be used when a time, for which the temperature of the air measured while the heater is deactivated fails to reach the lower limit of the temperature range, lasts for more than a preset time.

In accordance with another exemplary embodiment of the present disclosure, there is provided a control method for a drying machine comprising a heat pump system and a heater for heating air to be supplied into a drum, and having a plurality of drying modes using the heat pump system and the heater individually or simultaneously, the method including activating the heat pump system when simultaneous use of the heat pump system and the heater is decided, and determining whether or not a filter, through which air discharged out of the drum flows, is blocked according to the temperature of air introduced into the drum. Here, the heater may be activated or deactivated according to whether or not the filter is blocked.

Here, the heater may be deactivated when the filter is determined to be blocked.

Also, both of the heater and the heat pump system may be activated when the filter is determined to be normal.

The control method may further include re-determining whether or not the filter is blocked according to a temperature difference between the air introduced into the drum and the air discharged out of the drum when a preset time elapses after both of the heater and the heat pump system are activated, and deciding whether or not to use the heater and the heat pump system according to the re-determination result.

Here, the re-determining as to whether or not the filter is blocked may be performed to determine that the filter is blocked when the temperature difference between the air introduced into the drum and the air discharged out of the drum is more than a preset filter block reference temperature difference.

Also, drying may be executed only using the heat pump system as the heat source when the time point that the filter is determined to be blocked is after a preset time elapses from a drying start time point.

In addition, the drying may be finished by cooling laundry accommodated in the drum when the time point that the filter is determined to be blocked is before a preset time elapses from the drying start time point.

The present disclosure may have effect of preventing an overload of a compressor and improving reliability of a heat pump system, with using both the heat pump system and a heater as a heat source for stably executing a drying process.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
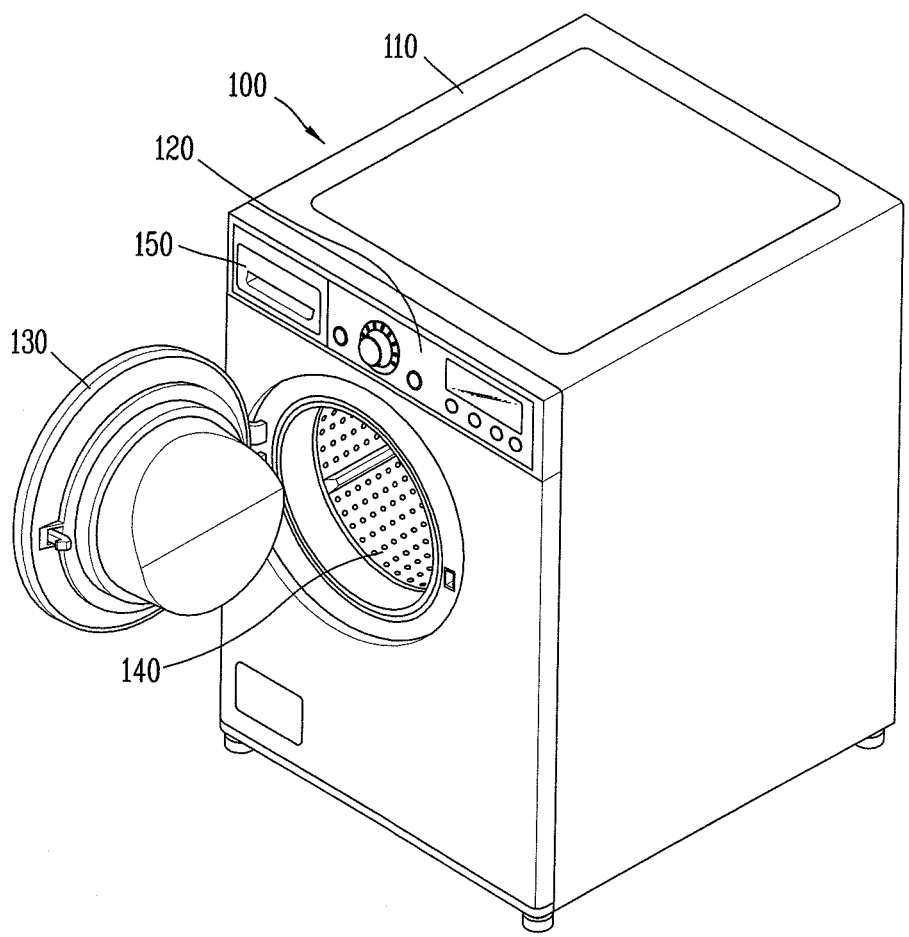
FIG. 1 is a schematic view showing an appearance of a drying machine in accordance with one exemplary embodiment.

FIG. 1 is a schematic view showing an appearance of a drying machine in accordance with one exemplary embodiment. As shown in FIG. 1, a drying machine 100 may include a main body 110 defining an appearance, and a drum 10 rotatably installed within the main body 110 and having a plurality of lifters protruding from an inner circumferential surface thereof. An introduction opening 140 through which clothes to be dried are thrown into the main body may be formed through a front surface of the main body 110.

The introduction opening 140 may be open or closed by a door 130. A control panel 120 having a variety of manipulation buttons for manipulating the drying machine 100 and a display may be located above the introduction opening 140. A drawer 150 may be disposed at one side of the control panel 120 and store therein liquid to be injected into the drum 10.

Figure 2:
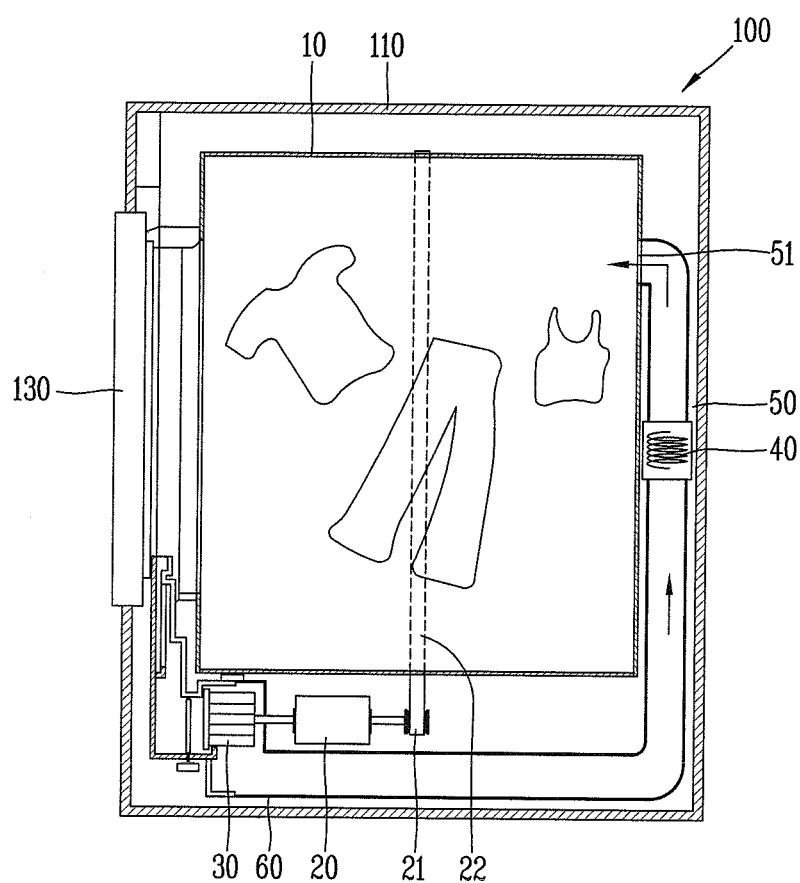
FIG. 2 is a schematic view showing an inside of the drying machine of FIG. 1.
Figure 3:
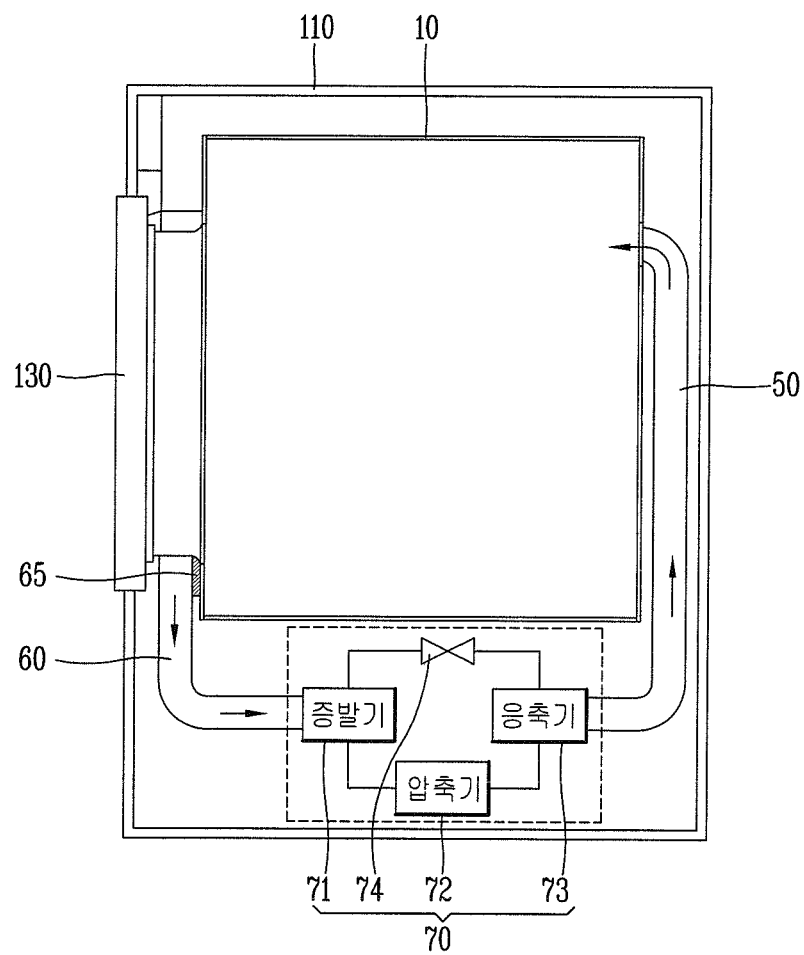
FIG. 3 is a schematic view showing a heat pump system disposed in the drying machine of FIG. 2.

FIGS. 2 and 3 are schematic views showing an inside of the drying machine shown in FIG. 1. As shown in FIG. 2, the drum 10 may be rotatably installed in the main body 110 to dry the clothes therein. The drum 10 may be rotatably supported by supporters (not shown) at its front and rear sides.

The drum 10 may be connected to a driving motor 20 located in a lower portion of the drying machine via a power transfer belt 22 so as to receive a rotational force. The driving motor 20 may include a pulley 21 disposed at one side thereof, and the power transfer belt 22 for driving the drum 10 may be connected to the pulley 21.

A suction duct 50 may be installed at the rear of the drum 10, and a heater 40 for heating air introduced may be installed in the suction duct 50. The heater 40 may use electric resistance heat of high temperature for enhancing efficiency of a space occupied thereby in the drying machine 100. The suction duct 50 may be provided with an outlet port 51 connected to the rear of the drum 10 to discharge heated air into the drum.

A lower side of the front of the drum 10 may be shown having a filter 65 for filtering off foreign materials such as lint and the like contained in air discharged out of the drum 10, and an exhaust duct 60 for exhausting the foreign material-filtered air from the drum 10. The suction duct 50 and the exhaust duct 60 may be divided into suction and exhaust based on the drum 10. Here, the present disclosure may not be limited to a circulating type drying machine which is exemplarily shown in FIG. 2, but be applied to an exhaust type drying machine.

In the exemplary embodiment of the circulating type drying machine as shown in FIG. 2, the suction duct 50 and the exhaust duct 60 may be integrally connected to each other to form a single circulation channel 55. However, in an exemplary embodiment (not shown) for the exhaust type drying machine, the suction duct and the exhaust duct may not be connected to each other.

A blowing fan 30 for sucking and forcibly blowing air contained in the drum 10 may be installed in the exhaust duct 60. For example, for the circulating type drying machine shown in FIG. 2, the exhaust duct may serve to guide air forcibly blown by the blowing fan 30 toward the drum 10 via the suction duct. However, for the exhaust type drying machine, the exhaust duct may guide air forcibly blown by the blowing fan 30 to the outside.

In this exemplary embodiment, the blowing fan 30 may be a pull-type blowing fan which exists in a duct, through which air within the drum is exhausted, to suck the air discharged from the drum toward the exhaust duct.

As aforementioned, the pulley 21 may be disposed at one side of the driving motor 20 and connected with the power transfer belt 22 for driving the drum 10. Here, a driving shaft of the blowing fan 30 for driving the blowing fan 30 may be connected to another side of the driving motor 20. Therefore, in the exemplary embodiment of FIG. 2, the drum and the blowing fan may simultaneously rotate in response to rotation of the driving motor. As such, a system for simultaneously driving the drum and the blowing fan using one motor may be referred to as a 1-motor system. In some cases, a driving motor for driving the blowing fan may also be separately provided.

In the exemplary embodiment shown in FIG. 3, a heat pump system 70 may be disposed to adsorb waste heat from air discharged from the drum 10 and supply the heat to air introduced into the drum 10. The exemplary embodiment of FIG. 3 may be a circulating type drying machine or an exhaust type drying machine.

The heat pump system 70 may configure a thermodynamic cycle by including a first heat exchanger 71 to adsorb waste heat from air discharged out of the drum 10, a compressor 72, a second heat exchanger 73 to heat air introduced into the drum, and an expansion valve 74. That is, the first heat exchanger 71, the compressor 72, the second heat exchanger 73 and the expansion valve 74 may be connected via pipes in a sequential manner.

Figure 4:
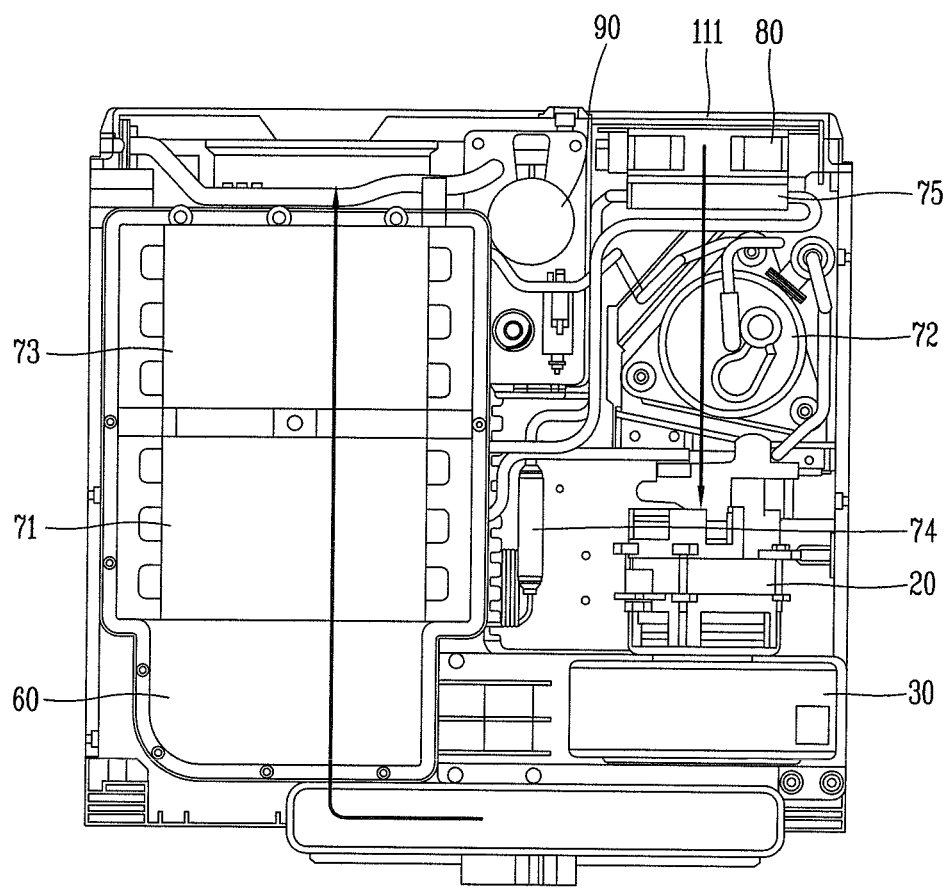
FIG. 4 is a schematic view showing the heat pump system and operating loads mounted in the drying machine of FIG. 1.

FIG. 4 shows an example that the heat pump system is mounted onto the main body of the drying machine. As shown in FIG. 4, the first heat exchanger 71 may be an evaporator and the second heat exchanger 73 may be a condenser based on a refrigerant of the heat pump system 70. The first heat exchanger and the second heat exchanger may have a structure of ensuring a sufficient heat transfer area with air by disposing one refrigerant pipe in a zigzag form and installing radiation fins on a surface of the refrigerant pipe.

Here, the evaporator may have a heat exchange capacity equal to or smaller than the condenser. That is, FIG. 4 shows the evaporator and the condenser have the same heat exchange capacity, but the evaporator may be designed to be smaller than the condenser, unlike the example of FIG. 4. This is to restore waste heat as much as possible to be used for heating air introduced into the drum. Also, this is to ensure reliability of the heat pump system by allowing energy adsorbed by the refrigerant to be discharged as much as possible through the condenser.

The expansion valve 74 may be implemented by using various types of valves. This exemplary embodiment employs a linear expansion valve (LEV) whose open degree (open level) is controlled by an electric signal. That is, a controller 200 to be explained later may decide the open degree of the valve by receiving an input pulse. Detailed description thereof will be given later.

Figure 5:
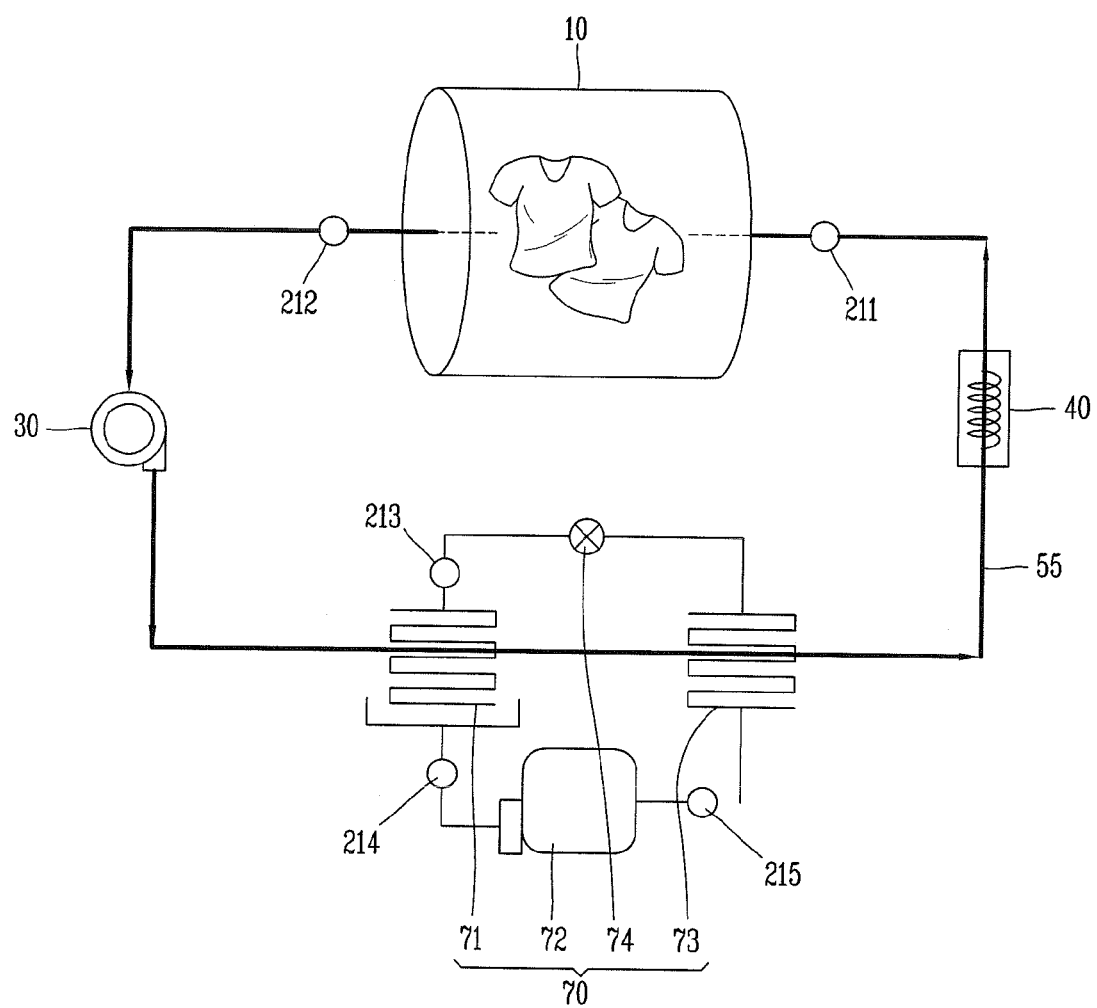
FIG. 5 is a schematic view showing a contact between an air channel and a heat source of the drying machine.

FIG. 5 shows an example of a circulating type drying machine, which shows a path that circulating air is heated through the heat pump system and a heater. As shown in FIG. 5, a refrigerant of the heat pump system may execute heat exchange with hot humid air, which passed through the drum, in the evaporator as the first heat exchanger 71 to become a gaseous state of low temperature. The refrigerant gas may then be compressed in the compressor into a gaseous state of high temperature and high pressure. Afterwards, the refrigerant may execute heat exchange with cold air, which is to be introduced into the drum, in the condenser as the second heat exchanger 73 to become a state of low temperature and high pressure. The refrigerant may be expanded in the expansion valve into a liquid state of low temperature and low pressure.

Here, for the circulating type drying machine, hot humid air which passed through the drum with evaporating moisture within the laundry may be cooled through the heat exchange with the first heat exchanger. Accordingly, the hot humid air may change into a cold dry state without moisture to be resupplied into the drum. On the other hand, for the exhaust type drying machine, air which becomes hot and humid as moisture is evaporated from the laundry may be cooled through the heat exchange with the first heat exchanger to be externally discharged in a cold dry state without moisture.

As a heat source for heating air to be introduced into the drum up to high temperature, at least one of the condenser as the second heat exchanger 73 or a heater 40 may be used. Such hot air introduced into the drum may dry the laundry, flow into the lower portion of the front of the drum, pass through the lint filter, and then flow through the exhaust duct.

Here, the heater may be selectively used. That is, when air is heated only using the heat pump system as the heat source, it is superior in view of energy efficiency but causes a problem of extending a drying time. Accordingly, the heater may be used as an auxiliary heat source according to user's selection, thereby reducing the drying time. However, it may be possible to use only the heater as the heat source according to the user's selection. Such a drying machine which can execute drying by selectively using the heat pump system and the heater may be referred to as a hybrid drying machine.

In the meantime, when the heater is selectively used, the heat pump system may be used as a main heat source and the heater as an auxiliary heat source. As aforementioned, the heat pump system is used as the main heat source in the aspect of its superior energy efficiency. For this structure, a heat supply capacity of the heat pump system may be larger than that of the heater. This is to enhance efficiency by varying the heat supply capacity according to the heat source because the heat pump system is used as the main heat source.

With the configuration, energy which is unused may be restored from air discharged out of the drum so as to be reused for heating air to be supplied into the drum, thereby enhancing energy efficiency. Also, with the use of both the heating pump system and the heater as the heat source for heating the air to be supplied into the drum, a drying time may be effectively reduced.

In the meantime, since the clothes drying machine according to the present disclosure uses the heat pump system for maximizing the energy efficiency, a refrigerant has to continuously circulate in the heat pump system. Here, in the heat pump system, the heat exchange between the refrigerant and air to be supplied into the drum may occur due to a phase change of the refrigerant. That is, a liquid refrigerant and a gaseous refrigerant may be coexistent on a path of the refrigerant in the heat pump system.

Here, if the evaporator side fails to obtain sufficient heat, some of refrigerant discharged from the evaporator may be introduced into the compressor side in a liquid state. When such liquid refrigerant is introduced into the compressor, it may cause damage on the compressor or lower energy efficiency. This may eventually cause a problem in reliability of the heat pump system.

Therefore, to sense such state, a temperature difference of a refrigerant passed through the evaporator may be sensed to indirectly check a vapor quality of the refrigerant. In the exemplary embodiment of FIG. 5, a temperature sensor 213 may be disposed at an inlet side of the evaporator 71 and a temperature sensor 214 may be disposed at an outlet side of the evaporator 71 or an inlet side of the compressor 72.

In addition, due to the use of the heater as the heat source, a heat load may be accumulated in the heat pump system and accordingly an overload in the compressor may arise. Hence, to sense such state, it may be necessary to measure temperature of the refrigerant at the inlet side and the outlet side of the compressor so as to prevent the overload of the compressor. To this end, a temperature sensor 215 may be disposed at the outlet side of the compressor 72.

Also, the clothes drying machine is a machine for drying the laundry containing moisture by supplying hot air. Hence, the laundry has to be protected from being damaged due to the hot air. Accordingly, a temperature of the inlet side of the drum may be measured in order to prevent air to be introduced into the drum from being overheated, and a temperature of the outlet side of the drum may be measured in order to prevent the increase in the temperature of the laundry when the laundry within the drum is dried sufficiently. Hence, a temperature sensor 211 may be disposed at an inlet side of the drum through which air is supplied into the drum, and a temperature sensor 212 may be disposed at an outlet side of the drum through which air is discharged out of the drum. Also, a humidity sensor 220 may be disposed at an inner side of the drum to be contactable with the laundry to accurately control the dried level (degree) of the laundry accommodated within the drum.

Figure 6:
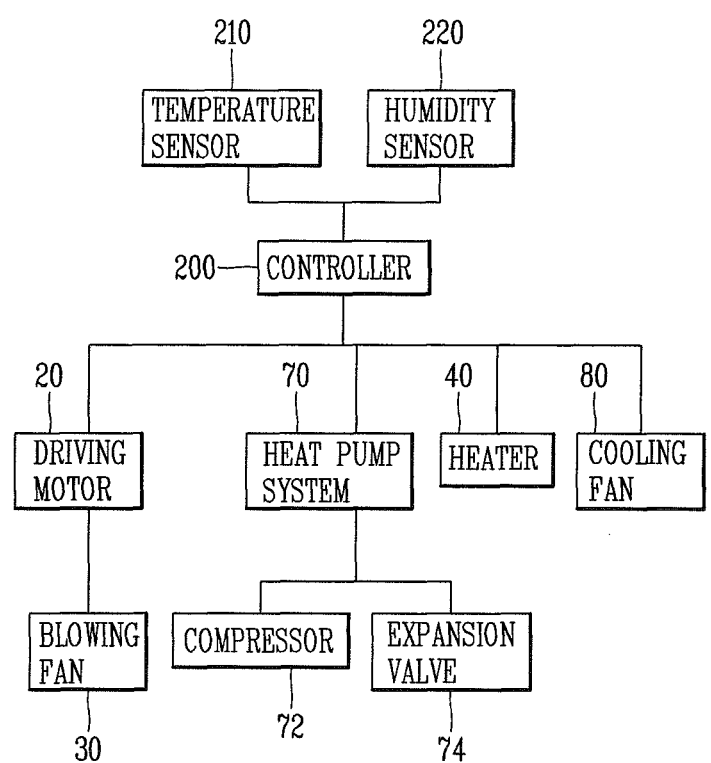
FIG. 6 is a schematic view showing an electric connection for controlling the drying machine.

In the exemplary embodiment, those temperature sensors 210: 211, 212, 213, 214 and 215 may preferably be implemented as a thermistor. FIG. 6 shows various components electrically connected to a controller. As shown in FIG. 6, the temperature sensors 210 and the humidity sensor 220 may be electrically connected to the controller 200 disposed in the drying machine, to send signals corresponding to measured temperature and humidity to the controller 200. In turn, the controller 200 may control the flow of the refrigerant of the heat pump system 70 through the expansion valve 74, control operations of the compressor 72 of the heat pump system 70 and the heater 40, control the driving motor 20 of the drum to control operations of the drum 10 and the blowing fan 30, and control a cooling fan 80 to be explained later and the like. Exemplary embodiments for the detailed control operations will be described in more detail later.

In addition, to ensure reliability of the heat pump system from the overload of the compressor, the compressor may be provided with a circuit breaker (OLP) to stop an operation of the compressor.

Also, the heat pump system of the exemplary embodiment shown in FIG. 4 may further include a third heat exchanger 75 as a second condenser for overcooling a refrigerant in order to maintain a proper state of the refrigerant introduced into the expansion valve. That is, the refrigerant has to enter the expansion valve in a liquid state. However, as a gaseous refrigerant is introduced into the expansion valve, the flow of the refrigerant in the expansion valve may be blocked. Therefore, for preventing this problem, the second condenser 75 for cooling the refrigerant into an overcooled state may be disposed.

Overcooling the refrigerant by use of the second condenser may also have an effect of preventing the overload of the compressor. That is, when pressure is dropped through the expansion valve after overcooling the refrigerant, the refrigerant may adsorb heat from air discharged from the drum more smoothly in the evaporator as the first heat exchanger. Accordingly, the refrigerant may go through a sufficient phase change through the evaporator, thereby preventing the overload of the compressor.

A cooling fan 80 may be separately disposed to increase efficiency of the second condenser 75. The cooling fan 80 may be disposed in the main body of the drying machine, to allow external air to be introduced into the main body through an inlet port 111 formed through the main body. The cooling fan 80 may thusly perform not only a function of enhancing the efficiency of the secondary condenser and preventing the overload of the compressor but also a function of cooling the compressor and the like by use of external air introduced into the drum. This may also bring an effect of reducing the overload of the heat pump system. In addition, the use of the cooling fan may further be efficient when the overload occurs in the compressor of the hybrid drying machine having the heater as the heat source, separate from the heat pup system, as illustrated in the present disclosure. The cooling fan 80 may be controlled by the controller 200.

Meanwhile, the filter 65 shown in FIG. 3 may filter off foreign materials contained in air discharged out of the drum. Especially, in the drying machine having the heat pump system of reusing the air discharged out of the drum and cooling the air through the heat exchanger to remove moisture, foreign materials such as lint and the like have to be filtered off through a filter. Since the heat exchanger such as the evaporator and the like of the heat pump system is disposed on the path of air through the exhaust duct, foreign materials contained in the air may be stacked in the evaporator. This may cause an overload of the compressor. Therefore, when the heat pump system operates as the drying machine starts to run, it may be necessary to check whether or not a filter is mounted.

To check whether or not the filter is mounted, the filter may be provided with a magnet (not shown), and a lead switch (not shown) may be disposed on the main body of the drying machine on which the filter is to be mounted. When the filter is mounted, the magnet may contact the lead switch, accordingly, it may be confirmed that the filter is mounted. More preferably, the heat pump system may be controlled to operate only after the filter mounting is checked.

Also, despite the filtering of the foreign materials in the air by use of the filter, remnant foreign materials may be stacked in the heat exchanger. A washing system (not shown) for spraying water on the surface of the heat exchanger to remove such remnant foreign materials may additionally be disposed. Here, washing water used may be water which is generated as moisture contained in air discharged out of the drum is condensed by the heat exchange with the evaporator.

The water generated as moisture contained in air discharged out of the drum is condensed by the heat exchange with the evaporator may be discharged outside by a pump 90 which is disposed in a lower portion of the main body of the drying machine, or be resupplied into the washing system by the pump 90. The pump 90 may be implemented as a BLDC pump.

The drying machine according to the exemplary embodiment may further include a steam spraying device (not shown) for spraying steam to the laundry. The steam spraying device may receive water supplied through a drawer disposed on the front surface of the drum. After the supplied water is pressed by the pump, steam may be generated through a steam generator. Afterwards, the steam may be sprayed into the drum. Water which is left without being changed into the steam form may flow toward the pump disposed in the lower portion of the main body so as to be discharged to the outside or reused.

The aforementioned drying process may be applied to a hybrid drying machine which can use both of the heat pump system and the heater. Here, a drying time and energy efficiency may depend on a heat source to be used.

In view of the energy efficiency, when the drying process is executed only using the heat pump system as the heat source for supplying hot air into the drum, this may be referred to as a general drying mode. Also, the drying process may be executed using both of the heat pump system and the heater as the heat source to reduce the drying time with regarding the energy efficiency. This may be referred to as a high speed drying mode. In addition, execution of the drying process only using the heater as the heat source may be referred to as a specific drying mode. The terms for the drying modes are merely illustrative for the sake of explanation. Such terms are merely used to clarify that the heat source for heating air to be supplied into the drum is different.

The general drying mode and the high speed drying mode may be applied to the drying machine according to the exemplary embodiment according to the user's selection. Also, the specific drying mode may be applied according to selection.

With the different heat source used in each of the drying modes, heat energy supplied per hour and heat load applied to the heat pump system may vary. Therefore, the heat source and the like in each drying mode may be controlled in a different manner. Detailed description thereof will be given later.

Devices or components disposed in the main body of the drying machine may be controlled by the controller 200. The controller 200 may control the devices based on measurements received from the temperature sensors and the humidity sensor.

One example of the control for the drying machine by the controller may be a heater activation control to determine whether or not to activate the heater by determining whether or not the compressor normally operates at an initial operation of the compressor. This is safety means for ensuring reliability of the compressor in the high speed drying mode.

The heater activation control may be applied when both of the heat pump system and the heater are selected as the heat source for heating air supplied into the drum, and may include activating the heat pump system (S110), and determining whether or not the compressor of the heat pump system normally operates (S120). Whether or not to use the heater as the heat source may be decided by the determination result of the step S120.

Figure 7:
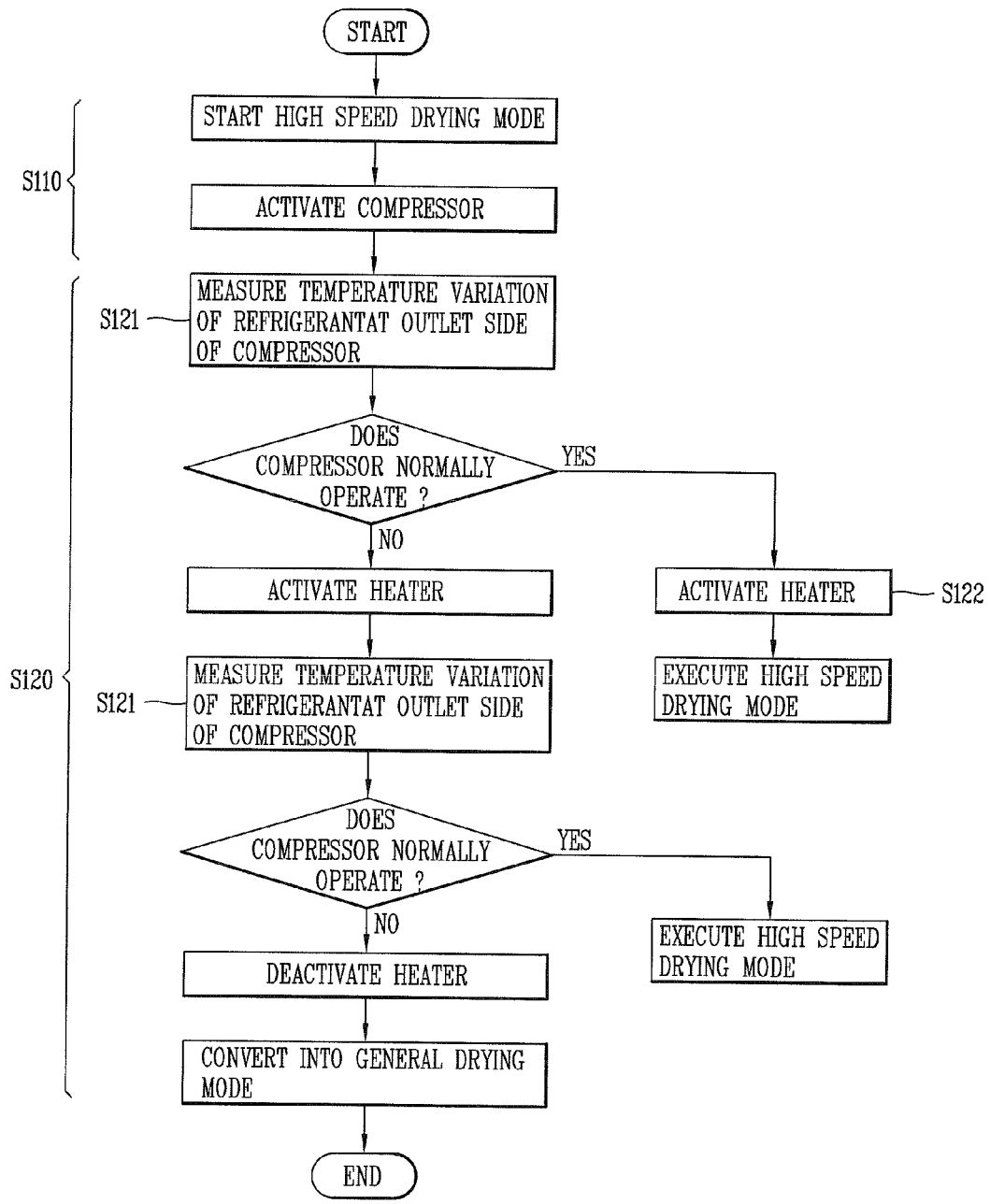
FIG. 7 is a flowchart showing a heater activation control according to whether or not a compressor of the heat pump system normally operates.

FIG. 7 shows an example of the heater activation control. As shown in FIG. 7, the activating of the heat pump system (S100) may refer to activating the heat pump system of the heat sources in response to the start of the drying process. That is, the controller 200 may store an initial temperature of the outlet side of the compressor when a drying start command is received. Afterwards, a load activation control by which the driving motor rotates backwardly and then forwardly in a sequential manner and the compressor is activated may be executed. The load activation control will be explained later.

The determining as to whether or not the compressor of the heat pump system normally operates (S120) may refer to determining whether or not the compressor normally operates according to a temperature variation of a refrigerant flowed through the compressor. Therefore, the determining step (S120) may include measuring the temperature variation of the refrigerant flowed through the compressor (S121).

That is, the controller may operate the compressor for a predetermined time, and re-measure the temperature of the outlet side of the compressor. Here, when the re-measured temperature variation of the refrigerant at the outlet side of the compressor is greater than a preset minimum difference value (or a reference temperature variation), the controller may determine it as the normal operation of the compressor so as to activate the heater (S122).

However, when the re-measured temperature variation of the refrigerant of the outlet side of the compressor is smaller than the preset minimum difference value, it may be likely that the compressor has not operated normally yet. It takes a predetermined time for a refrigerant compression cycle to reach a normal state in view of the characteristic of the heat pump system, a proper compression may not be done in the compressor at the beginning of the operation. In this state, the temperature variation of the refrigerant may be less than in the normal state. Besides, the refrigerant may not be properly compressed by the compressor at the beginning of the operation of the compressor for various reasons. Therefore, whether or not the compressor normally operates may be checked based on the temperature variation. Here, when the re-measured temperature of the outlet side of the compressor is higher than the lower limit of a reference operating temperature, the compressor may be considered to normally operate. Accordingly, the controller may activate the heater. However, when the re-measured temperature of the outlet side of the compressor is lower than the lower limit of the reference operating temperature, the compressor may be considered to abnormally operate.

When the measured temperature variation of the refrigerant at the outlet side of the compressor is lower than the preset minimum difference value, there may be likelihood that the compressor can normally operate as time elapses. Hence, the controller may activate the heater and thereafter re-measure the temperature of the refrigerant at the outlet side of the compressor. Here, when the temperature variation of the refrigerant at the outlet side of the compressor after activating the heater is greater than the preset minimum difference value, it may correspond to the normal operation of the compressor. The controller 200 may thus execute the high speed drying mode. Here, since the heat has been activated, a separate task to operate the heater may not be required.

However, when the temperature variation of the refrigerant at the outlet side of the compressor after activating the heater is smaller than the preset minimum difference value, the controller may turn off the heater and forcibly convert the mode of the drying machine into the general drying mode to execute the drying process.

In the meantime, the filter disposed in the drying machine may be blocked in some cases. Especially, when a high heat load is applied to the heat pump system due to heat energy supplied from the heater in the high speed drying mode, air may not smoothly circulate due to the filter blocked. In this state, an overload of the compressor may occur and an internal temperature of the drum may increase, thereby damaging the laundry. Therefore, an example of executing a filter block control for determining whether or not to activate the heater at the beginning by sensing the blocked state of the filter may also be considered.

Figure 8:
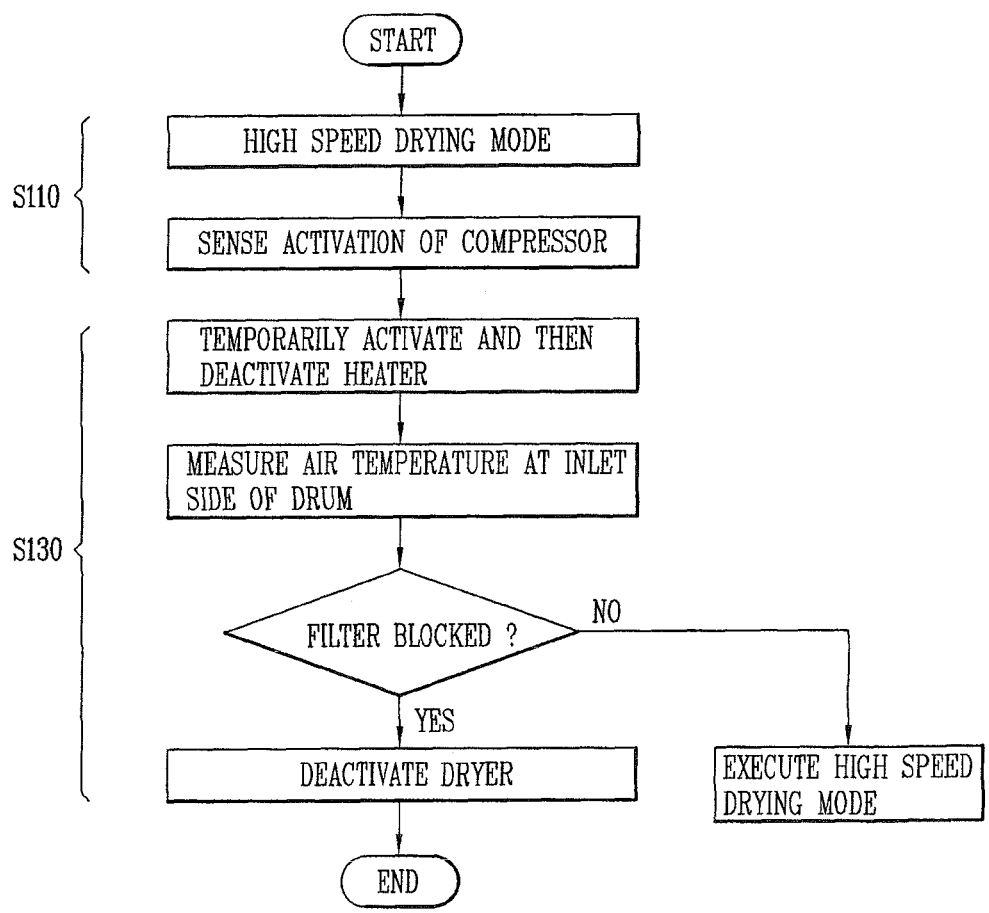
FIG. 8 is a flowchart showing a filter block control according to whether or not a filter is blocked at an initial operation of the heat pump system.

This modified embodiment may further include determining whether or not a filter through which air discharged from the drum flows is blocked based on the temperature of air introduced into the drum (S130), noticing the fact that air temperature within the drum increases when the filter is blocked. Accordingly, the heat pump system may be stopped to operate according to whether or not the filter is blocked. Referring to FIG. 8, after activating the heat pump system (S110), the controller 200 may sense the activated state of the heat pump system. That is, the controller may sense the initial operation of the compressor.

Afterwards, the determining as to whether or not the filter is blocked (S130) may be executed. In the determining step (S130) as to whether or not the filter is blocked, the controller may temporarily activate and then deactivate the heater. Afterwards, when the temperature of air introduced into the drum is more than a filter block reference temperature, the filter may be determined to be blocked. When the temperature of the air is less than the filter block reference temperature, the filter may be determined to be unblocked. Accordingly, the controller may normally activate the heater to execute the drying process in the high speed drying mode.

That is, the controller may measure the temperature of the air at the inlet side of the drum after executing the process of temporarily activating and then deactivating the heater once or plural times. When the temperature of the air at the inlet side of the drum is more than the filter block reference temperature, the controller may determine that the filter is blocked and stop the operation of the dryer. Also, the controller may display an announcement message on the control panel and generate an alarm sound so as for the user to recognize the blocking of the filter or the thusly-caused stop of the drying machine.

In addition, when the temperature of the air at the inlet side of the drum reaches the upper limit of a preset temperature range due to the temporary activation of the heater, the controller may deactivate the heater to lower the temperature of the air supplied into the drum. When the temperature of the air reaches the lower limit of the temperature range, the controller may simultaneously execute a drum temperature control of reactivating the heater, which will be explained later.

Here, in order to determine whether or not the heater normally operates, the controller may additionally determine whether or not a difference between an initially measured air temperature Tin1 at the inlet side of the drum and a re-measured air temperature Tin2 at the inlet side of the drum is more than a predetermined reference value. The controller may determine that the heater normally operates when the difference is more than the reference value, while determining that the heater abnormally operates when the difference is below the reference value.

When the difference is more than the reference value and the dried level measured by the humidity sensor is more than a reference value, the drying process may be executed in the general drying mode without activating the heater. That is, due to the high dried level of the laundry introduced, rapid drying may be enabled even without use of the heater and thus energy consumption may be reduced. However, when the dried level measured by the humidity sensor fails to reach the reference value, the drying process may be executed in the high speed drying mode for fast drying.

In the meantime, when the temperature difference is less than the reference value, the controller may re-measure the temperature difference after a lapse of a preset time. When the re-measured temperature difference is more than the reference value, it may be determined that the heater has reached the normal state. Hence, as aforementioned, whether or not to activate the heater may be decided according to the dried level of the laundry. However, when the re-measured temperature difference fails to reach the reference value, it may mean that the heater is still in the abnormal state. Hence, the controller may execute the drying process in the general drying mode without activating the heater.

Meanwhile, there may be a case that the filter is blocked during the drying process although it was under the normal condition when drying started. In this case, when the heater is activated, high heat load may be applied to the heat pump system by heat energy supplied from the heater. Furthermore, air circulation may not be smooth due to the blocked lint filter. As a result, an overload of the compressor may be caused and the laundry may be damaged due to an increase in the internal temperature of the drum. Therefore, it may be necessary to execute a filter block control during drying, by which the blocked state of the filter is continuously sensed during the drying process to deactivate the heater, even when the drying is started normally.

Figure 9:
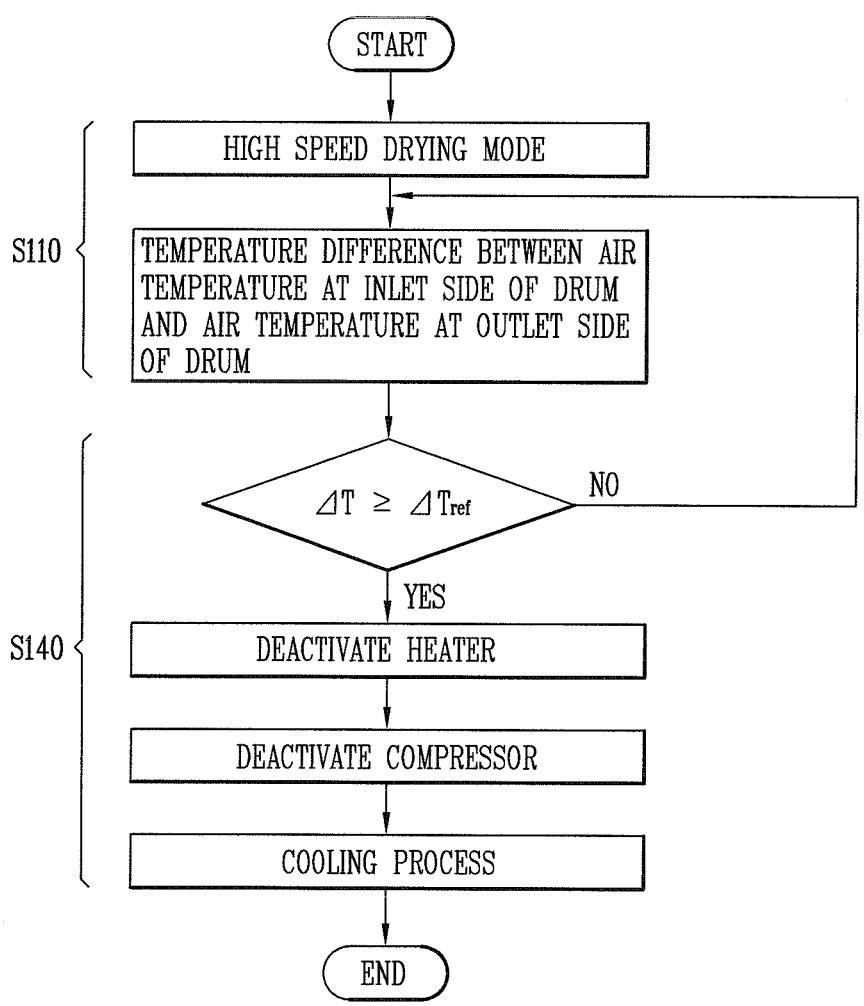
FIGS. 9 and 10 are flowcharts each showing a filter block control during drying, executed after the filter block control of FIG. 8.
Figure 10:
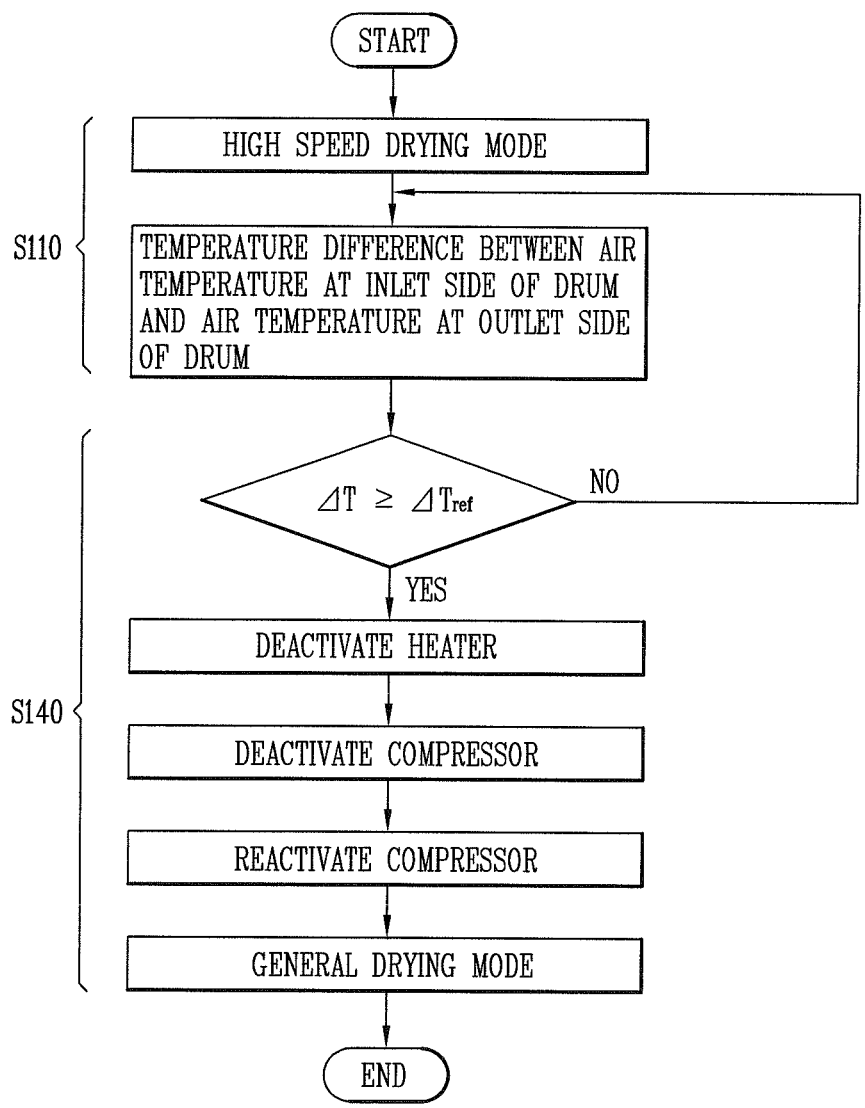

FIGS. 9 and 10 show an example of executing the filter block control during drying. The filter block control during drying may further include re-determining whether or not the filter is blocked according to the temperature difference between air introduced into the drum and air discharged out of the drum when a preset time elapses after the heater is activated. During the drying process, differently from before drying, the heater and the heat pump system have to be activated according to a selected drying mode. Hence, when the heater is randomly turned on or off, it may influence on drying performance and efficiency. Therefore, the filter block control during drying may be executed to check whether or not the filter is blocked based on the temperature variation of air flowed through the drum when the heater is activated during the drying.

The re-determining whether or not the filter is blocked (S140) may be executed to determine that the filter is blocked when the temperature difference between the air introduced into the drum and the air discharged out of the drum is more than a preset filter block reference temperature difference, thereby deactivating the heater and the compressor.

The controller may sense a temperature difference $\Delta T$ between the air introduced into the drum and the air discharged out of the drum. When the temperature difference is more than a reference value $\Delta Tref$, the controller may deactivate the heater.

The controller may deactivate the compressor after deactivation of the heater. The controller may also display an announcement message on the control panel and generate an alarm sound to help the user's recognition.

Here, the drying process may be considered by dividing into a case where drying has been fully executed and a case where drying has not been fully executed.

When the filter is determined to be blocked after a preset time has elapsed from the drying start time point, it may indicate that the drying has considerably progressed. Hence, the controller may use only the heat pump system as the heat source. The controller may not terminate the operation of the drying machine but reactivate the compressor after a lapse of a preset time. That is, the drying machine may be forcibly converted from the high speed drying mode into the general drying mode and the heat pump system may be merely used as the heat source.

However, when the preset time has not elapsed yet, it may indicate that the drying has not considerably progressed. Hence, when the heat pump system is activated until the drying is completed, an overload may be caused due to the blocked filter. Therefore, the compressor may be deactivated.

The exemplary embodiments of the heater activation control and the filter block control illustrate the control operations for stably operations of the devices along with the activation of the heat pump system. That is, the aforementioned control operations may be efficiently executed only when the heat pump system simultaneously operates stably. The heat pump system may operate the compressor to stably circulate the refrigerant flowing through a refrigerant pipe. Therefore, the stable operation of the compressor may be an important factor for reliability of the heat pump system.

For the hybrid drying machine with the heat pump system, when an overload occurs in the compressor, reliability of the compressor may be lowered and the internal temperature of the drum may increase, which may result in occurrence in damage on the laundry. Therefore, the controller may execute a compressor temperature control for controlling the temperature of a refrigerant flowed through the compressor in order to prevent the overload of the compressor.

In the exemplary embodiments of the compressor temperature control, activation and deactivation of the heater or the cooling fan may be repetitively executed according to the temperature of the refrigerant passed through the compressor. This is because an example of using the heat pump system and the heater as the heat sources and an example of using only the heat pump system are controlled in different manners.

Figure 11:
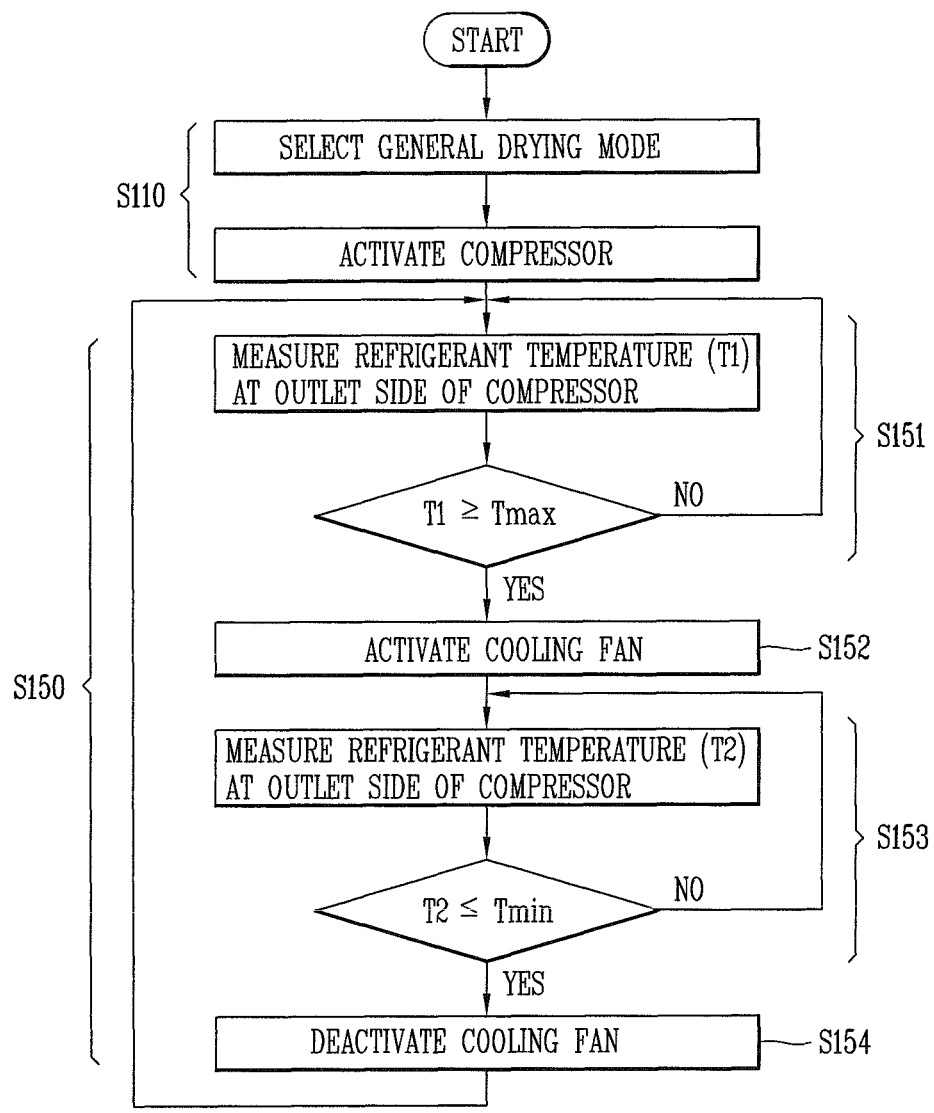
FIGS. 11 and 12 are flowcharts each showing a temperature control for the compressor of the heat pump system.
Figure 12:
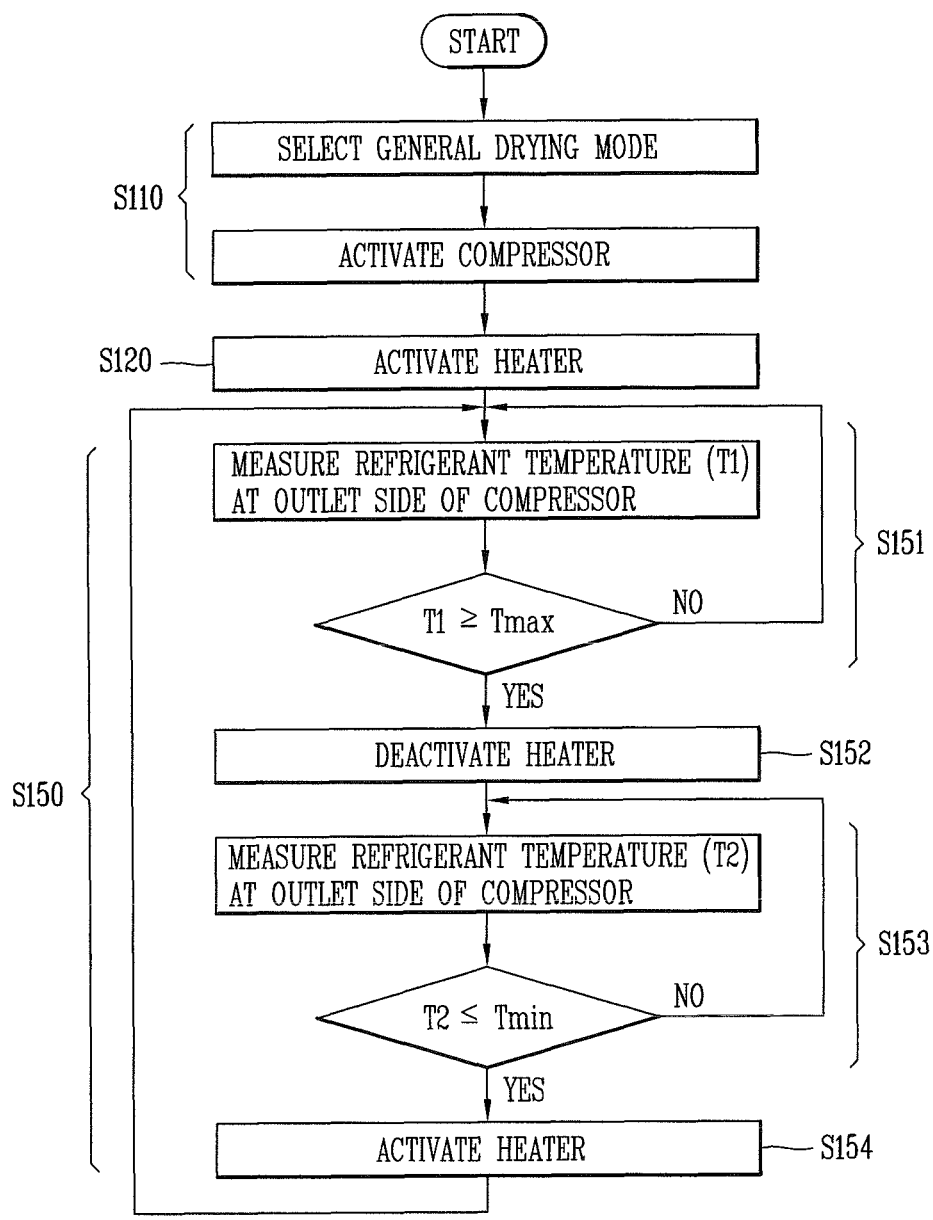

FIG. 11 shows an exemplary embodiment of the compressor temperature control when only the heat pump system is used as the heat source, and FIG. 12 shows an exemplary embodiment of the compressor temperature control when both of the heat pump system and the heater are used as the heat source.

The compressor temperature control step (S150) may include measuring the temperature of the refrigerant flowed through the compressor while the heater is activated so as to determine whether or not the measured temperature is within a preset temperature range (S151), deactivating the heater or activating the cooling fan when the temperature of the refrigerant flowed through the compressor, measured while the heater is activated or the cooling fan is deactivated, reaches the upper limit of the preset temperature range (S152), measuring the temperature of the refrigerant flowed through the compressor while the heater is deactivated or the cooling fan is activated so as to determine whether or not the measured temperature is within the preset temperature range (S153), and reactivating the heater or deactivating the cooling fan when the temperature of the refrigerant flowed through the compressor, measured while the heater is deactivated or the cooling fan is activated, reaches the lower limit of the temperature range (S154).

The compressor temperature control step (S150) may be executed after the heat source is activated in response to the start of the operation of the drying machine. That is, the compressor temperature control step (S150) may be executed after both the heat pump system (S110) and the heater (S120) are activated in the high speed drying mode, after the heat pump system is activated (S110) in the general drying mode.

In the step (S151) of measuring the temperature of the refrigerant flowed through the compressor while the heater is activated so as to determine whether or not the measured temperature is within the preset temperature range, the controller may measure a temperature T1 of the refrigerant discharged from the compressor through the temperature sensor disposed at the outlet side of the compressor. Afterwards, the controller may determine whether or not the temperature of the refrigerant is within a preset temperature range Tmin~Tmax.

The preset temperature range may be different depending on a drying course and a drying mode which are selected by the user according to the type of laundry. That is, the heat energy supplied has to vary because the internal temperature of the drum to be maintained is different according to the type of laundry, and also the heat load of the compressor has to vary.

Based on the determined temperature of the refrigerant, when the temperature of the refrigerant measured while the heater is activated reaches the upper limit of the preset temperature range, the controller may deactivate the heater or activate the cooling fan (S152). That is, when the temperature T1 of the refrigerant at the outlet side of the compressor reaches the upper limit of the temperature range, the controller may activate the cooling fan or deactivate the heater, so as to lower the temperature of the compressor.

When the drying process is executed in the general drying mode, as shown in FIG. 11, the controller may activate the cooling fan (S152), to discharge heat accumulated in the refrigerant and cool the compressor in a manner of supplying external air. Also, when the drying is executed in the high speed drying mode, as shown in FIG. 12, the controller may deactivate the heater (S152) to reduce the heat load applied to the heat pump system.

Afterwards, the controller may measure the temperature of the refrigerant flowed through the compressor while the heater is deactivated or the cooling fan is activated, to determine whether or not the measured temperature is within the preset temperature range (S153). That is, the controller may continuously sense the temperature T2 of the refrigerant at the outlet side of the compressor, to determine whether or not the temperature of the refrigerant reaches the lower limit of the temperature range.

When the temperature of the refrigerant measured while the heater is deactivated or the cooling fan is activated reaches the lower limit of the temperature range, the controller may reactivate the heater or deactivate the cooling fan (S154). That is, when the temperature of the refrigerant reaches the lower limit of the temperature range, it may indicate that the temperature of the compressor becomes stable. Therefore, the controller may deactivate the cooling fan again or activate the heater again. The controller may deactivate the cooling fan (S154), as shown in FIG. 11, when the drying is executed in the general drying mode, and reactivate the heater (S154), as shown in FIG. 12, when the drying is executed in the high speed drying mode. Accordingly, the controller may control heat to be fully supplied into the drum.

Also, in the compressor temperature control step (S150), when the heater is reactivated or the cooling fan is deactivated as the temperature of the refrigerant, measured while the heater is deactivated or the cooling fan is activated, reaches the lower limit of the preset temperature range (S154), the controller may re-measure the temperature of the refrigerant flowed through the compressor while the heater is activated or the cooling fan is deactivated and determine whether or not the re-measured temperature is within the preset temperature range (S151) in a repetitive manner.

In the meantime, if the temperature of the refrigerant fails to reach the lower limit of the temperature range within a preset time even through the heater is deactivated or the cooling fan is activated, the compressor may be determined to be still in the overload condition. Also, such overload condition of the compressor may be caused due to a continuous increase in the temperature T2 of the refrigerant at the outlet side of the compressor. In this case, the temperature of the compressor may be separately controlled through a compressor reliability ensuring control to be explained later.

The hybrid drying machine has to continuously operate the heat pump system, accordingly, the operating reliability of the compressor may be an important factor. Therefore, in order to maintain the reliability of the compressor, when the overload occurs in the compressor, it may cause serious problems in devices of the drying machine or the drying process. Therefore, the compressor reliability ensuring control for preventing such problems may be required.

The compressor reliability ensuring control may be executed differently in the general drying mode and in the high speed drying mode. This is because the heat source and the heat load are different in each drying mode and accordingly the controller takes a different control manner.

In the general drying mode, as aforementioned, the compressor temperature control (S150) is implemented by the activation control for the cooling fan, and the controller has determined whether or not to activate the cooling fan by measuring the temperature of the refrigerant at the outlet side of the compressor.

Figure 13:
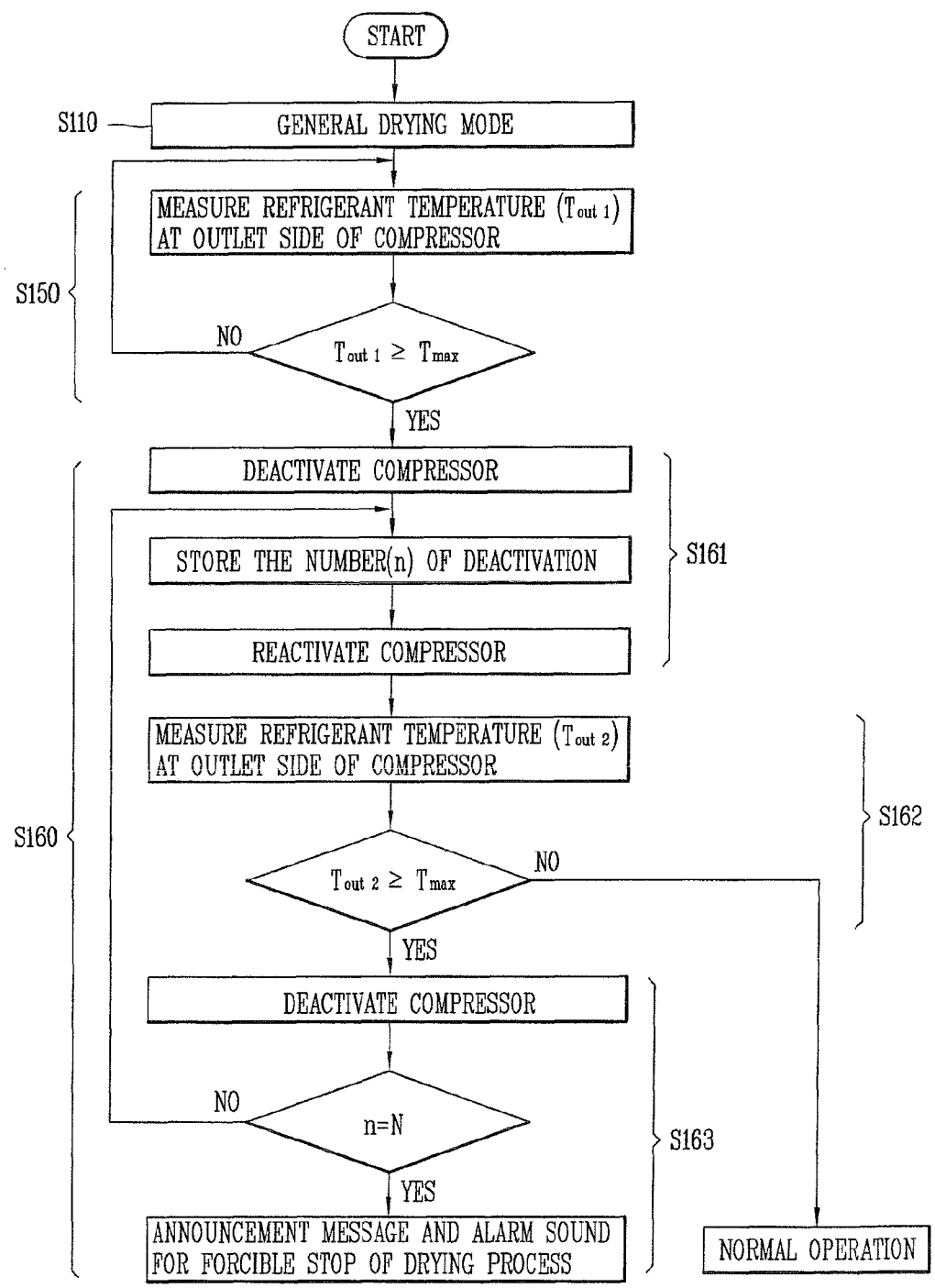
FIGS. 13 and 14 are flowcharts each showing a temperature control for the compressor of the heat pump system in an overload condition.

FIG. 13 shows the compressor reliability ensuring control in the general drying mode. As shown in FIG. 13, the compressor reliability ensuring control step (S160) in the general drying mode may include reactivating the compressor after temporary deactivation (S161), measuring the temperature of the refrigerant flowed through the compressor to determine whether or not the measured temperature is more than a preset overload reference temperature Tmax (S162), and deactivating the compressor or the drying machine according to whether or not the measured temperature of the refrigerant reaches the preset overload reference temperature Tmax (S163).

In the step (S161) of reactivating the compressor after the temporary activation, the controller may deactivate the compressor and then reactivate the compressor after a preset time.

Afterwards, the controller may sense the temperature Tout2 of the refrigerant at the outlet side of the compressor to determine whether or not the sensed temperature is below the overload reference temperature Tmax (S162). Here, when the temperature of the refrigerant at the outlet side of the compressor is over the overload reference temperature again, the controller may deactivate the compressor again and then reactivate the compressor after the preset time (S163).

Here, the controller may store the number (n) of deactivation of the compressor. Accordingly, when the number of deactivation of the compressor reaches a preset number of times, the controller may forcibly terminate the drying process. In addition, the controller may generate an announcement message on the control panel and an alarm sound to help the user's recognition.

In the meantime, the overload of the compressor may occur because the temperature of a refrigerant at an inlet side of the evaporator increases although the temperature of the refrigerant at the outlet side of the compressor has not reached an operating temperature of the cooling fan. It may be problematic because heat exchange is not fully executed in the evaporator due to the increase in the temperature of the refrigerant at the inlet side of the evaporator.

In this state, the controller may sense a temperature Tin1 of the refrigerant at the inlet side of the evaporator. When the temperature of the refrigerant reaches an upper limit reference temperature Tref2 of the inlet side of the evaporator, the controller may initially reduce an open degree of the expansion valve to reduce the flow of the refrigerant. This may allow for the full heat exchange of the refrigerant through the evaporator.

Afterwards, the controller may measure a temperature Tin2 of the refrigerant at the inlet side of the evaporator. When the measured temperature of the refrigerant is still more than the reference temperature Tref2, the controller may secondarily reduce the open degree of the expansion valve. At this moment, the open degree of the expansion valve may be reduced gradually.

The controller may repeat the aforementioned operations until the temperature Tin2 of the refrigerant at the inlet side of the evaporator is dropped below the reference temperature Tref2. Here, when the expansion valve is in the minimum open state in response to the reduction of the open degree, such state may be maintained. That is, since the lowest operation of the heat pump system is required to progress the drying process, the heat pump system may be driven by limiting the flow of refrigerant as less as possible by opening expansion valve the lowest.

In the high speed drying mode, as aforementioned, the compressor temperature control has been achieved by the operation control for the heater and the controller has determined whether or not to activate the heater by measuring the temperature of the refrigerant at the outlet side of the compressor.

The heater may be turned on only when the temperature of the refrigerant at the outlet side of the compressor reaches the lower limit of the temperature range. However, when the temperature of the refrigerant fails to reach the lower limit of the temperature range for more than a preset time, it may be considered as the heat pump system is under the overload condition. Also, even when the temperature of the refrigerant at the outlet side of the compressor continuously increases to reach a preset limit temperature, it has to be considered as the heat pump system is under the overload condition.

Figure 14:
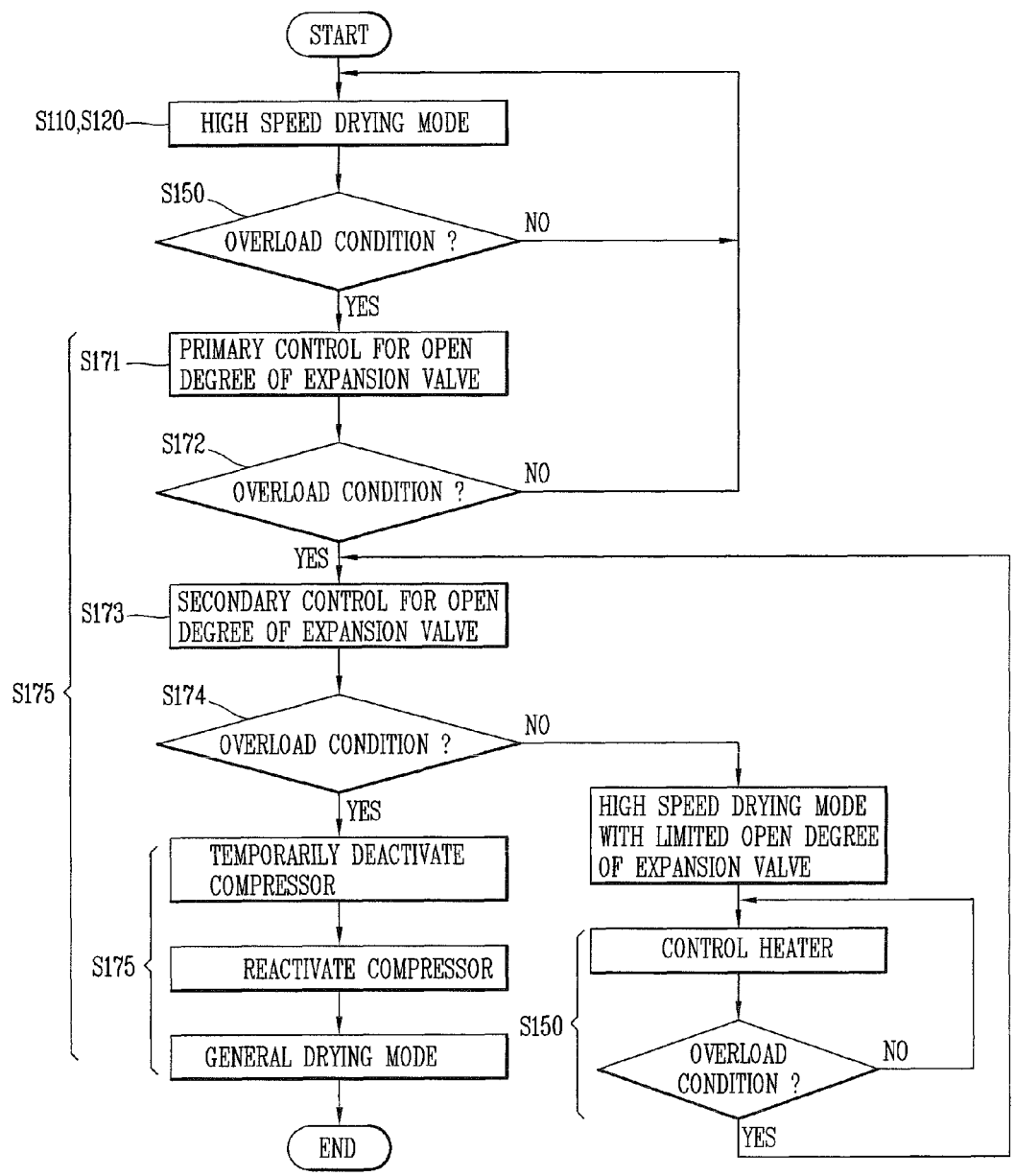

FIG. 14 shows the compressor reliability ensuring control in the high speed drying mode. As shown in FIG. 14, the compressor reliability ensuring control in the high speed drying mode (S170) may include a primary valve control step (S171) of controlling an open degree of the expansion valve of the heat pump system, and a secondary valve control step (S173) of additionally controlling the open degree of the expansion valve.

The primary valve control step (S171) may include a first decreasing step of gradually decreasing the open degree of the expansion valve, measuring the temperature of the refrigerant flowed through the compressor during the first decreasing step to determine whether or not the measured temperature is within a preset temperature range (S172), and a first increasing step of gradually increasing the open degree of the expansion valve when the measured temperature of the refrigerant reaches the lower limit of the preset temperature range.

In more detail, the controller may primarily gradually decrease the open degree of the expansion valve. The controller may continuously sense the temperature of the refrigerant at the outlet side of the compressor while decreasing the open degree of the expansion valve (S172). Here, when the temperature of the refrigerant at the outlet side of the compressor reaches the lower limit of the temperature range, the controller may then gradually increase the open degree of the expansion valve. Here, when the measured temperature of the refrigerant reaches the lower limit of the preset temperature range, the heater may be activated. This is to execute the drying process in the high speed drying mode because of the escape from the overload condition. The decrease of the open degree of the expansion valve may be continued until the open degree of the expansion valve reaches the lowest value of a preset first open degree range.

In the primary valve control step (S171), the open degree of the expansion valve may gradually increase through the first increasing step, and the temperature of the refrigerant flowed through the compressor may be re-measured to re-determine whether or not the re-measured temperature is within the temperature range. Also, the open degree of the expansion valve by the first decreasing step and the second increasing step may be limited to the highest value of the first open degree range.

Here, when the temperature of the refrigerant at the outlet side of the compressor does not come back into a normal range in spite of execution of the primary valve control step, the secondary valve control step (S173) may be executed. In detail, the secondary valve control step may be executed when the temperature of the refrigerant fails to reach the lower limit of an appropriate range for all that the open degree of the expansion valve has been controlled to be the lowest value of the first open degree range, or when the temperature of the refrigerant is maintained to be more than the upper limit of the appropriate range for more than a preset time for all that the open degree of the valve is the highest value.

The secondary valve control step (S173) may include a second decreasing step of gradually decreasing the open degree of the expansion valve, measuring the temperature of the refrigerant flowed through the compressor to determine whether or not the measured temperature is within the temperature range (S174), and a second increasing step of gradually increasing the open degree of the expansion valve when the measured temperature of the refrigerant reaches the lower limit of the temperature range.

In more detail, the controller may gradually decrease the open degree of the expansion valve again. The controller may continuously sense the temperature of the refrigerant at the outlet side of the compressor with decreasing the open degree of the expansion valve. Here, when the temperature of the refrigerant at the outlet side of the compressor reaches the lower limit of the temperature range, the controller may then gradually increase the open degree of the expansion valve again. Here, when the measured temperature of the refrigerant reaches the lower limit of the temperature range, the heater may be turned on.

The decrease of the open degree of the expansion valve may be executed until the open degree of the expansion valve is close to a completely closed state. Also, the increase in the open degree of the expansion valve may be executed until the open degree of the expansion valve reaches the lowest value of the first open degree range. This is because it is obvious that the overload condition has not been overcome in the primary control.

During the second valve control, the temperature of the refrigerant at the inlet side of the evaporator may be dropped below the lower limit. In this case, the temperature of the refrigerant may not be controllable only by controlling the expansion valve. Therefore, the controller may temporarily deactivate the compressor and thereafter reactivate the compressor. If the heater is in an activated state, the controller may first deactivate the heater, temporarily deactivate the compressor, and then reactivate the compressor. Here, the controller may execute the secondary valve control after the reactivation of the compressor.

Also, in the secondary valve control step (S173), the controller may gradually increase the open degree of the expansion valve through the second increasing step, and re-measure the temperature of the refrigerant flowed through the compressor to re-determine whether or not the re-measured temperature is within the temperature range. The open degree of the expansion valve by the second decreasing step and the second increasing step may be limited to a preset second open degree range.

Meanwhile, when the temperature of the refrigerant flowed through the compressor still exceeds the upper limit of the temperature range or fails to reach the lower limit of the temperature range within a preset time even through the secondary valve control step was executed, the controller may reactivate the compressor after the temporary deactivation through a tertiary control (S175), and use only the heat pump system as the heat source.

That is, the tertiary valve control (S175) may be a control step performed when the temperature of the refrigerant at the outlet side of the compressor fails to reach the lower limit of the temperature range and the open degree of the expansion valve is decreased to be close to the completely closed state. This may also include a case where the temperature of the refrigerant at the outlet side of the compressor is over the preset limit temperature for more than a preset time.

In the tertiary valve control (S175), the controller may deactivate the compressor and then reactivate the compressor after a preset time. Here, the controller may control the open degree of the expansion valve into the completely closed state simultaneously with deactivating the compressor. Afterwards, the controller may gradually open the valve as less as possible in the deactivated state of the compressor. The gradually opening of the valve may indicate that the open degree of the valve increases step by step. For example, the valve may be open up to 55 pulses, which corresponds to the lowest open degree of the valve, in a step-by-step manner. Here, the valve may be open for two seconds with 35 pulses and thereafter open with 55 pulses. When the open degree of the valve reaches the lowest open degree, the controller may completely close the valve after a preset time. For example, the controller may open the valve for three minutes with 55 pulses and thereafter completely close the valve.

When the compressor is reactivated after a lapse of a preset time, the controller may maintain the completely closed state of the valve for a preset time after the activation of the compressor. Afterwards, the controller may gradually increase the open degree of the valve. The increase in the open degree of the valve may be executed until reaching a preset open degree of the valve applied to the general drying mode. That is, through the tertiary valve control, the drying machine may be forcibly converted from the high speed drying mode into the general drying mode so as to use only the heat pump system as the heat source.

Meanwhile, when the overload condition has not been overcome even after the drying is executed in the general drying mode through the tertiary control, the aforementioned compressor reliability ensuring control step (S160) in the general drying mode may be executed.

The hybrid drying machine may include the driving motor of the drum and the blowing fan both connected to the same driving shaft. Hence, when the drum does not operate, the blowing fan may not be driven. Accordingly, when the blowing fan does not operate even though the heat pump system and the heater are activated to heat air, it may cause a problem in driving the heat pump system.

Therefore, the exemplary embodiments of the heater activation control, the filter block control and the compressor temperature control may preferably be executed after the driving motor is driven. Accordingly, it may be necessary to execute a load activation control for controlling activation of loads of the drying machine, such as the driving motor, the heat source and the like.

Figure 15:
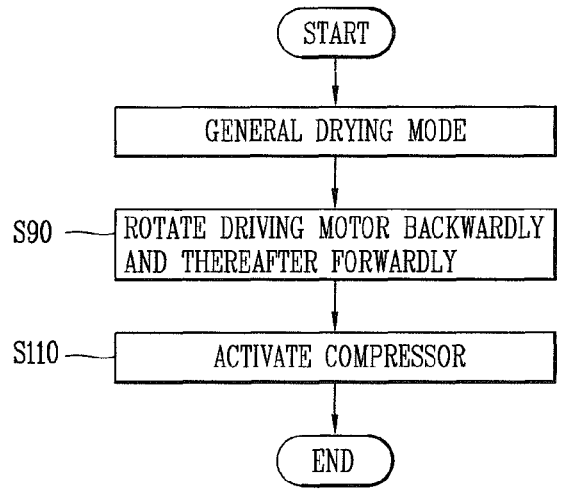
FIGS. 15 to 17 are flowcharts each showing an activation control for various types of loads of the drying machine.
Figure 16:
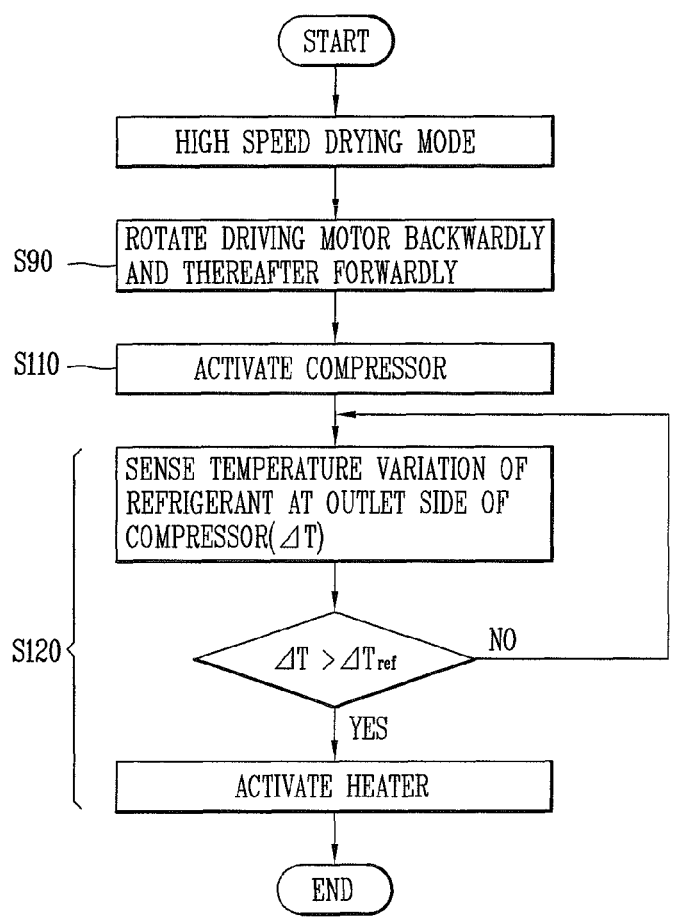

FIGS. 15 and 16 show the load activation control. As shown in FIGS. 15 and 16, the load activation control may include activating the drum by driving the driving motor (S90), activating the heat pump system by turning on the compressor (S110), and activating the heater as the heat source according to whether or not the compressor normally operates.

In the drum activating step (S90), the driving motor may rotate backwardly and then forwardly in a sequential manner for a preset time, and the heat pump system activating step (S110) may be started after the forward rotation of the driving motor.

In more detail, once starting the drying process, the controller may first drive the driving motor or the drum. Afterwards, the controller may activate the compressor to turn on the heat pump system.

For operating the drum, the controller may rotate the driving motor backwardly for a short time and thereafter rotate it forwardly. This is for setting a tension of a belt in the aspect of the characteristic of the hybrid drying machine having a belt type power transfer system, and to prevent the flow of overcurrent at the beginning of an operation in view of the characteristic of the driving motor. Here, the forward rotation and the backward rotation of the drum may be decided because a specific direction has been set to the forward rotation in the exemplary embodiment. Also, in this exemplary embodiment, the blowing fan is implemented as a pull-type blowing fan which exists on a duct for exhausting air from the drum so as to suck the air discharged from the drum toward the exhaust duct, and a single-motor system is used. Therefore, a direction that the blowing fan rotates for sucking the air toward the exhaust duct may preferably be set to the forward direction.

The aforementioned processes in the general drying mode may be executed as shown in FIG. 15, and the aforementioned processes in the high speed drying mode may be executed as shown in FIG. 16. In FIG. 15, as the compressor is activated after the forward rotation of the driving motor, the heat pump system may be activated (S110). Here, the controller may activate the compressor after the driving motor rotates forwardly for a preset time. This is to smoothly operate the heat pump system by activating the compressor after the blowing fan is driven by the operation of the driving motor, as aforementioned.

However, in the high speed drying mode, as shown in FIG. 16, the heater activation control (S120) may be executed. In the high speed drying mode, the drying machine may use the heater as well as the heat pump system as the heat source. Hence, the controller may turn on the heater after sensing the activation of the compressor. This is to prevent the overload of the compressor at the initial operation, which may be caused due to activating the heater first.

The sensing of the activation of the compressor by the controller may be achieved by the aforementioned heater activation control (S120) according to whether or not the compressor normally operates. That is, the controller may sense the temperature variation ΔT of the refrigerant by the temperature sensor installed at the outlet side of the compressor, and determine that the compressor is normally operating when the temperature variation of the refrigerant exceeds the preset reference value ΔTref.

In the meantime, when the user opens the door of the drying machine or inputs a temporary stop command after starting the drying process of the hybrid drying machine, every device where a load is generated has to be deactivated. Therefore, a load deactivation control (S180) may be executed.

When the user selects the general drying mode and the load deactivation control (S180) is executed, the controller may sense a stop command or a stop situation (S181), and immediately deactivate the compressor (S182). The controller may stop the driving motor when a preset time elapses after the compressor is deactivated (S183). This may be performed because the blowing fan is also deactivated when the driving motor is stopped simultaneously with the compressor and it influences the reliability of the heat pump system.

Figure 17:
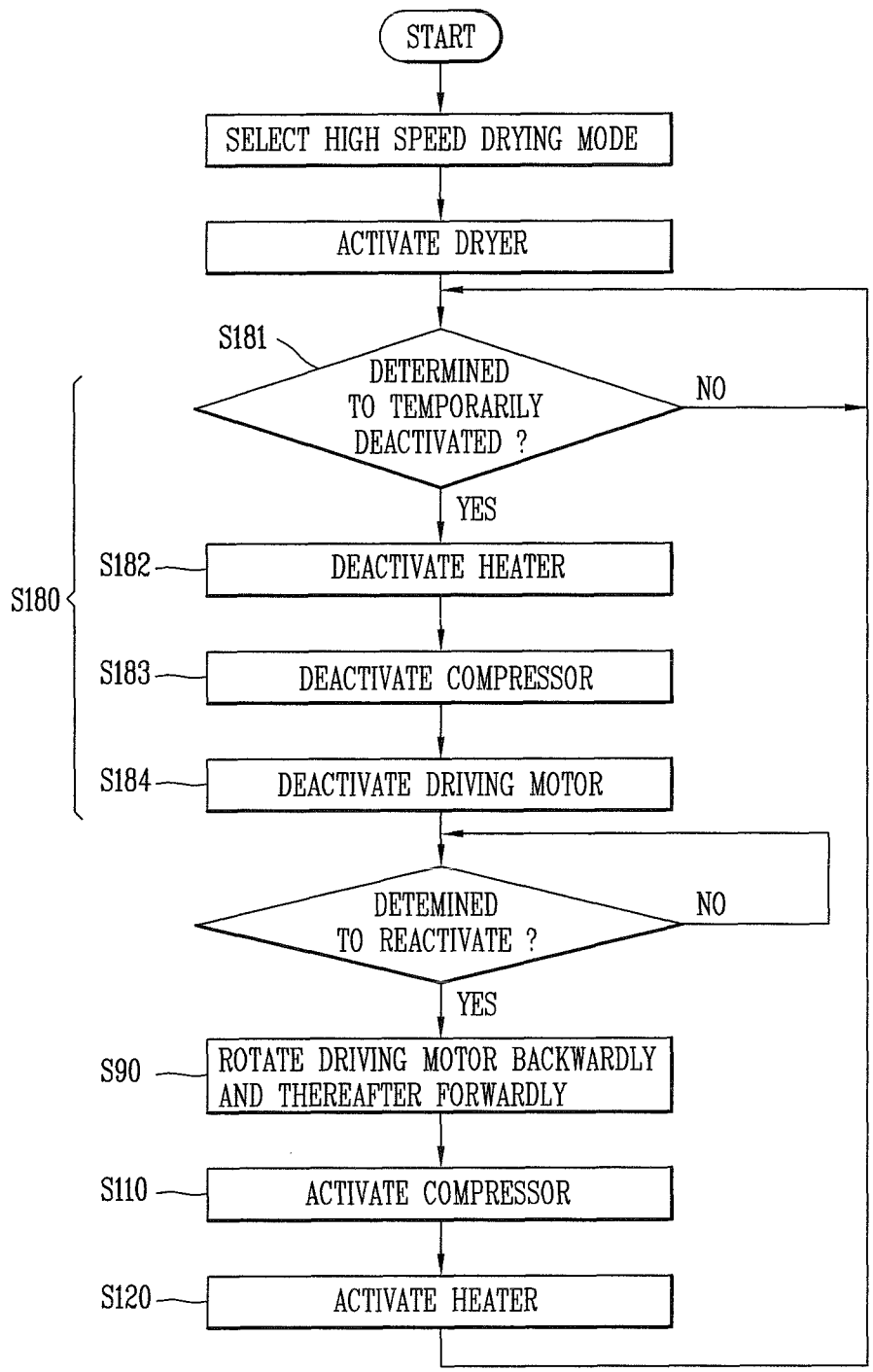

FIG. 17 shows that the user selects the high speed drying mode and the load deactivation control (S180) is executed. After the drum is driven (S90) and then the heater pump system (S110) and the heater (S120) are activated, when the controller senses the deactivation command or situation (S181), the controller may immediately deactivate the heater (S182). After deactivation of the heater, the controller may deactivate the compressor (S183). Also, the controller may stop the driving motor (S184) when a preset time elapses after the compressor is deactivated. This is because the overload of the compressor can be prevented only when the heater is deactivated earlier than the heat pump system in the aspect of the characteristic of the hybrid drying machine.

When the drying machine which has been temporarily deactivated is restarted, the aforementioned load activation control may be executed. Referring to FIG. 16, the controller may first drive the driving motor or the drum (S190). Afterwards, the compressor may be activated (S110) to turn on the heat pump system. In addition, in the high speed drying mode, the controller may sense the activation of the compressor and then turn on the heater (S120).

Here, the controller may drive the driving motor and the drum in the order of rotating the driving motor backwardly for a short time and then rotating the driving motor forwardly. There is not a great difference from the exemplary embodiment for the aforementioned load activation control.

The hybrid drying machine may use the heat pump system as a main heat source. The heat pump system may adsorb heat energy from air discharged from the drum using the phase change of the refrigerant and supply the heat energy to air to be supplied into the drum. Therefore, a gaseous refrigerant and a liquid refrigerant may be coexistent in the evaporator as the heat exchanger in which the phase change of the refrigerant occurs.

However, prior to starting to run the drying machine, a refrigerant existing in components constructing the heat pump system has come to pressure equilibrium and exists in a liquid form. Therefore, at the beginning of running the drying machine, when the compressor of the heat pump system is activated, bubbles of the liquid refrigerant may be introduced into the compressor. Here, when the bubbles of the refrigerant in the liquid form are introduced into the compressor, a leakage current may be generated in the compressor. Thus, such generation of the leakage current should be prevented. Accordingly, the controller may control the heat pump system to be activated, such that the bubbles of the refrigerant in the liquid form cannot be introduced into the compressor by adjusting the flow of the refrigerant, thereby preventing the leakage current generated at the initial operation of the compressor. That is, the controller may adjust the flow of the refrigerant through a variable expansion valve (e.g., linear expansion valve (LEV)).

Figure 18:
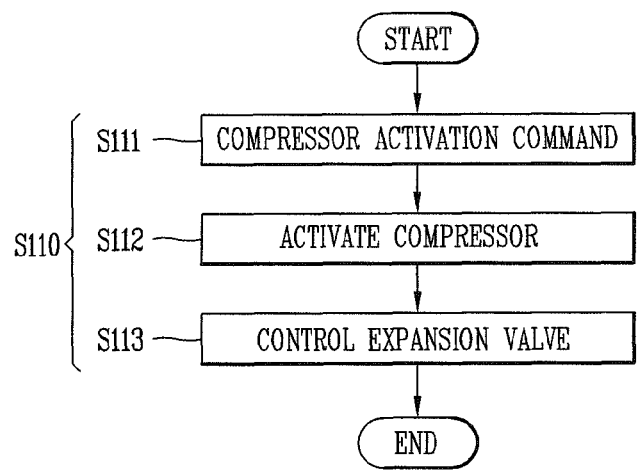
FIGS. 18 to 20 are flowcharts each showing an activation control for the heat pump system for blocking leakage current.

Referring to FIG. 18, the heat pump activating step (S110) may include checking an activation command for the heat pump system (S111), activating the compressor in a completely closed state of the expansion valve of the compressor (S112), and gradually opening the expansion valve after activation of the compressor (S113).

At the initial state, the controller may maintain the open degree of the valve in the completely closed state. In this state, when the activation command for the compressor is sensed (S111), the controller may maintain the completely closed state of the valve for a preset time after activating the compressor (S112). Afterwards, the controller may gradually increase the open degree of the valve (S113). This is to control the flow of the refrigerant and change the refrigerant into a gaseous state using a choking effect in the expansion valve so as to be introduced into the compressor.

Figure 21:
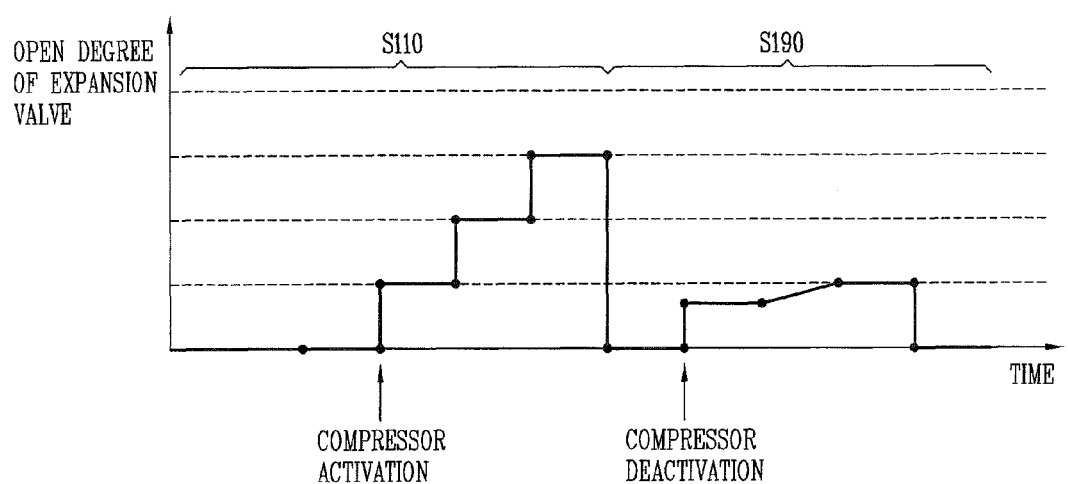
FIG. 21 is a graph showing an expansion valve control for the activation control for the heat pump system of FIG. 19.

FIG. 21 shows the variation of the open degree of the expansion valve. As shown in FIG. 21, when the activation command for the compressor is sensed, the controller may immediately activate the compressor. Here, the controller may gradually increase the open degree of the valve after maintaining the completely closed state of the valve for five seconds.

The gradual increasing of the open degree of the valve may refer to increasing the open degree of the valve step by step, as shown in FIG. 21. For example, after completely closing the valve for 5 seconds, the valve may be open by 55 pulses which correspond to the least open degree, and then gradually open step by step per 30 seconds. The increase in the open degree of the valve may be executed until reaching a preset open degree which is applied to each of drying courses and driving modes. For example, if it is assumed that the preset open degree of the valve corresponds to 135 pulses, the valve may be open by 10 pulses per 30 seconds. Here, the numerical values indicating the time and the open degree of the valve are merely illustrative, and may not be construed to limit the scope of the present disclosure.

When a preset time elapses after the compressor is deactivated, the refrigerant in the heat pump system may come to pressure equilibrium. Here, the refrigerant remaining in the liquid form may be likely to be introduced into the compressor. Accordingly, a leakage current may be generated in the compressor. Therefore, a heat pump system deactivation control may be required.

Here, two types of the compressor deactivation, namely, normal deactivation and abnormal deactivation, may be considered.

Figure 19:
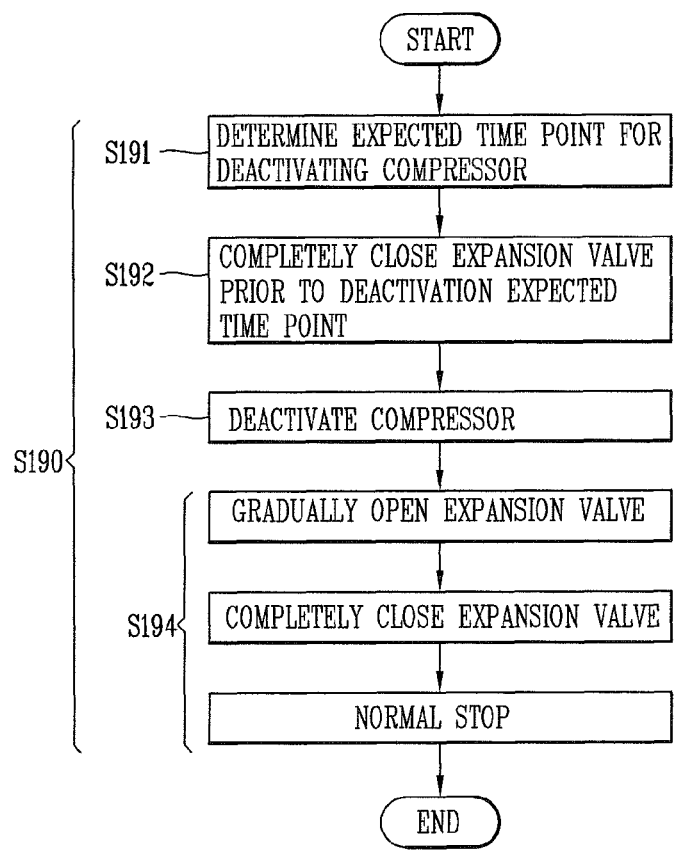

FIG. 19 shows the heat pump system deactivation control when the compressor is normally deactivated (S190). The controller may determine a time point when the compressor is expected to be deactivated (i.e., compressor deactivation-expected time point) (S191). The controller may completely close the variable expansion valve earlier by a preset time than the compressor deactivation-expected time point (S192). Here, the compressor deactivation-expected time point may be estimated based on a time, which is taken according to each preset drying course and drying mode. Referring to FIG. 21, for example, the controller may completely close the valve five seconds earlier than the compressor deactivation-expected time point. Accordingly, the refrigerant introduced into the evaporator prior to deactivating the compressor may be blocked, thus processing the refrigerant in the liquid form which may remain in the evaporator.

Afterwards, the controller may deactivate the compressor (S193). Also, the controller, as shown in FIG. 21, may gradually open the valve to the minimum. The gradual increase in the open degree of the valve may refer to increasing the open degree of the valve step by step. For example, after the compressor is deactivated, the valve may be open up to 55 pulses as the least open degree in the step-by-step manner. Here, the valve may be open with 55 pulses after being open sequentially for 2 seconds with 35 pulses and for 2 seconds with 45 pulses.

When the valve is open up to the minimum open degree, the controller may completely close the valve after a preset time (S194). For example, after opening for 3 minutes with 55 pulses, the valve may be completely closed. Accordingly, the expansion valve may be gradually open after the refrigerant in the liquid phase remaining in the evaporator is completely exhausted. This may allow the refrigerant flowed through the expansion valve to be expanded into a gaseous phase by the choking effect so as to remain in the evaporator in the gaseous state.

Figure 20:
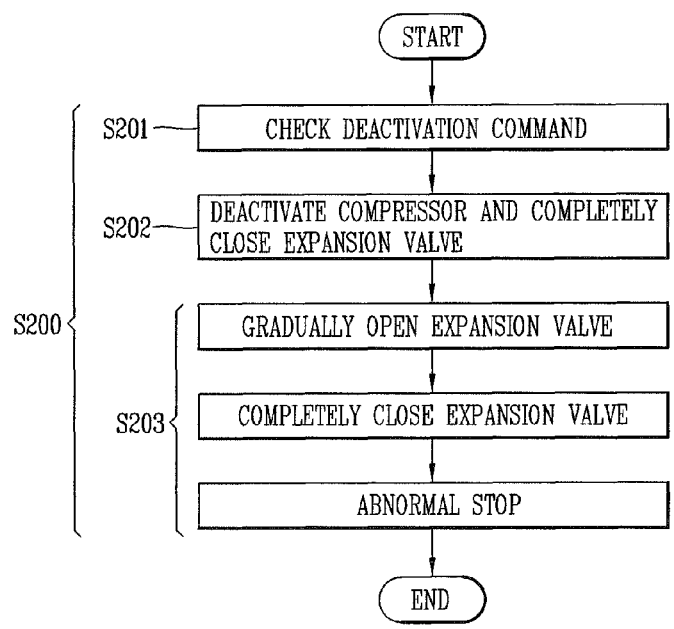

FIG. 20 shows the heat pump system deactivation control when the compressor is abnormally deactivated (S200). As shown in FIG. 20, the controller may check a compressor deactivation command (S201). The controller may deactivate the compressor and simultaneously control the valve into the completely closed state (S202). This is because every load has to be stopped immediately when the compressor is abnormally deactivated.

Afterwards, the controller may gradually open the valve to the minimum (S203). The gradual increase in the open degree of the valve may refer to increasing the open degree of the valve step by step. For example, the valve may be gradually open up to 55 pulses which correspond to the minimum open degree. Here, the valve may be open with 55 pulses after being open for 2 seconds with 35 pulses.

When the valve reaches the minimum open degree, the controller may completely close the valve after a preset time (S203). For example, the valve may be completely closed after being open for 3 minutes with 55 pulses.

When the compressor is reactivated after being abnormally deactivated, the aforementioned exemplary embodiment for the activating of the heat pump system (S110) may be applied.

In the meantime, for the hybrid drying machine with the heat pump system, high energy efficiency may be observed but a drying time may extend. Accordingly, the heater as an additional heat source may be used. Therefore, in the high speed drying mode even using the heater as the heat source, an overload of the compressor may be caused or the internal temperature of the drum may drastically increase, causing damage on the laundry. Therefore, the controller may control the temperature of air flowed through the drum so as to prevent the damage on the laundry, which may be caused due to the drastic increase in the internal temperature of the drum in the high speed drying mode.

The temperature control for air flowed through the drum may be considered in two aspects, namely, preventing the drastic increase in the temperature of the laundry and preventing the temperature of air supplied into the drum from increasing high enough to damage the laundry.

In the aspect of preventing the drastic increase in the temperature of the laundry, the drum temperature control (S210) may be achieved by repetitively activating and deactivating the heater according to the temperature of air supplied into the drum or the temperature of air discharged out of the drum.

Figure 22:
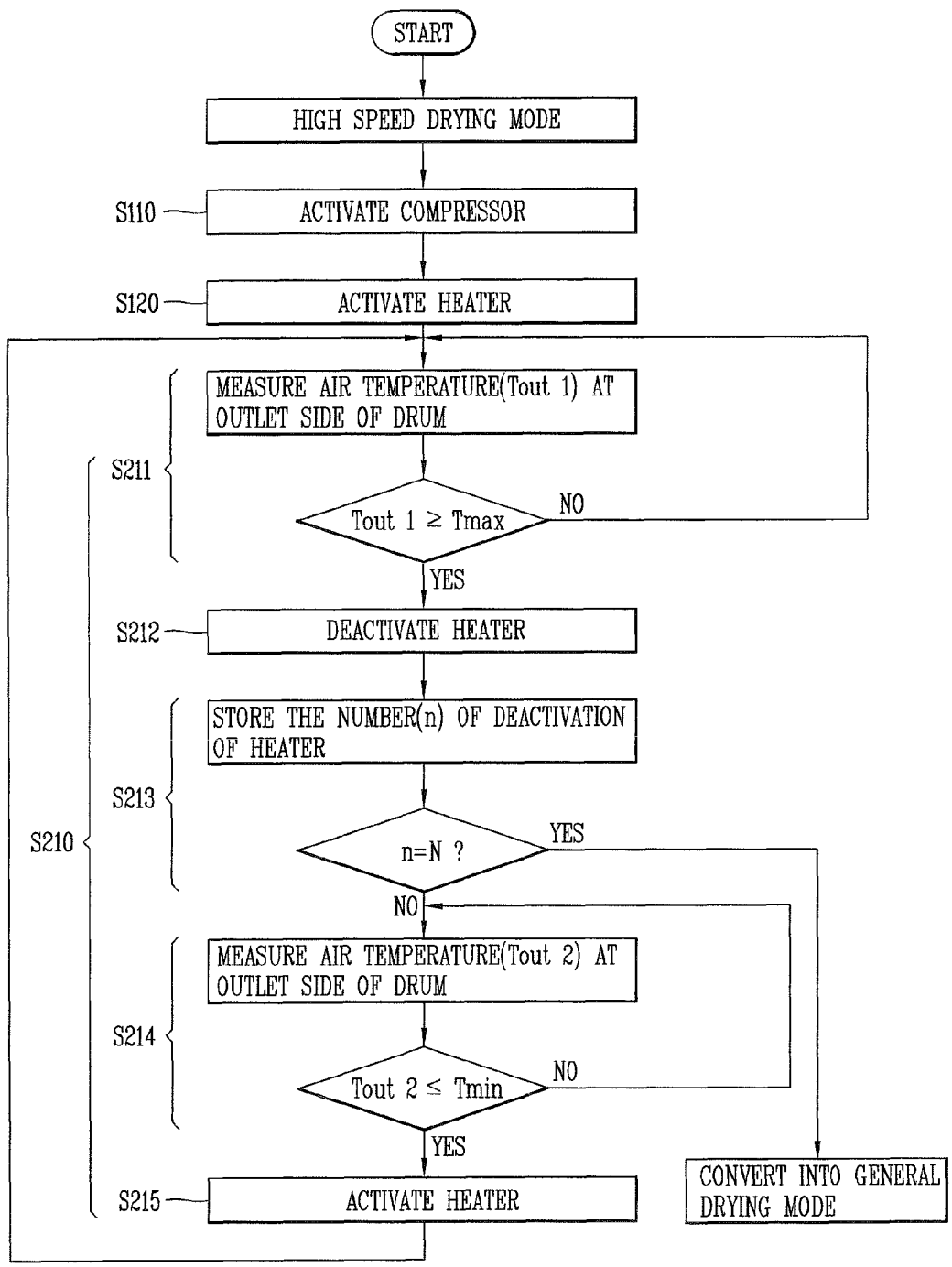
FIGS. 22 and 23 are flowcharts each showing a temperature control for a drum.

FIG. 22 shows an example of the drum temperature control (S210). The drum temperature control step (S210) may be achieved after activating the heat pump system (S110) and activating the heater (S120) in the sequential manner. That is, the exemplary embodiment shown in FIG. 22 may be executed in the high speed drying mode that uses both of the heat pump system and the heater as the heat source.

In the drum temperature control step (S210), the activation and deactivation of the heater may be repeated according to the temperature of air supplied into the drum or the temperature of air discharged out of the drum, and only the heat pump system may be used as the heat source when the number of deactivation of the heater reaches a preset reference number of times.

The drum temperature control step (S210) may include measuring the temperature of the air supplied into the drum or the temperature of the air discharged out of the drum while the heater is activated and determining whether or not the measured temperature is within a preset temperature range (S211), deactivating the heater when the temperature of the air measured while the heater is activated reaches the upper limit of the temperature range (S212), measuring the temperature of the air supplied into the drum or the temperature of the air discharged out of the drum while the heater is deactivated and determining whether or not the measured temperature is within the preset temperature range (S214), and reactivating the heater when the temperature of the air measured while the heater is deactivated reaches the lower limit of the temperature range (S215).

FIG. 22 shows an example of controlling the temperature of the drum based on the temperature of the air discharged out of the drum. As shown in FIG. 22, in the step (S211) of measuring the temperature of the air discharged out of the drum while the heater is activated and determining whether or not the measured temperature within the temperature range, the controller may measure the temperature Tout1 of the air discharged out of the drum through the temperature sensor installed at the outlet side of the drum. This is performed to indirectly measure the temperature of the air discharged out of the drum because the temperature of the laundry within the drum is unable to be directly measured.

The controller may determine whether or not the measured air temperature Tout1 is within the preset temperature range Tmin~Tmax. The preset temperature range may vary depending on a drying course and a drying mode selected by the user according to the type of laundry. This is why the internal temperature of the drum to be maintained may be different according to the type of laundry.

Afterwards, when the temperature Tout1 of the air at the outlet side of the drum reaches the upper limit of the temperature range, the controller may lower the temperature of air to be supplied into the drum by deactivating the heater (S212).

The controller may measure the temperature Tout2 of the air at the outlet side of the drum while the heater is deactivated and determine whether or not the measured temperature of the air reaches the lower limit of the temperature range (S214).

When the temperature of the air reaches the lower limit of the temperature range, the controller may reactivate the heater (S215). When the air temperature fails to reach the lower limit of the temperature range, the controller may continuously leave the heater in the deactivated state so as to prevent the increase in the internal temperature of the drum.

When the heater is reactivated as the temperature of the air measured in the deactivated state of the heater reaches the lower limit of the temperature range (S215), the controller may re-measure the temperature of the air supplied into the drum or the temperature of the air discharged out of the drum in the activated state of the heater and re-determine whether or not the re-measured temperature is within the temperature range (S211).

Here, when the temperature Tout2 of the air at the outlet side of the drum continuously fails to reach the lower limit of the temperature range, the heater may be kept deactivated. Hence, the same effect of converting the drying mode into the general drying mode may be obtained. Or, the controller may automatically control the drying mode into the general drying mode after a preset time. That is, when a time for which the temperature of the air measured during deactivation of the heater fails to reach the lower limit of the temperature range is extended more than a preset time, only the heat pump system may be used as the heat source.

In the meantime, the drum temperature control step (S210) may further include determining whether or not the number of deactivation of the heater reaches the preset reference number of times as the temperature of the air measured during activation of the heater reaches the upper limit of the temperature range (S213). That is, when the deactivation of the heater is repeated by the aforementioned control, the controller may calculate the repetitive number (n) to determine whether or not the calculated repetitive number (n) reaches the preset number (N).

Here, when the number of the deactivation of the heater reaches the preset reference number of times, the heat pump system may merely be used as the heat source, accordingly, the drying mode may be automatically converted into the general drying mode.

However, the drum temperature control step may repetitively execute the reactivation and deactivation of the heater according to the temperature of the air supplied into the drum or the temperature of the air discharged out of the drum when the number of the deactivation of the heater fails to reach the preset reference number of times.

In the meantime, in the aspect of preventing the temperature of the air supplied into the drum from increasing high enough to damage the laundry, the controller may measure the temperature Tin1 of the air supplied into the drum through the temperature sensor installed at the inlet side of the drum.

Figure 23:
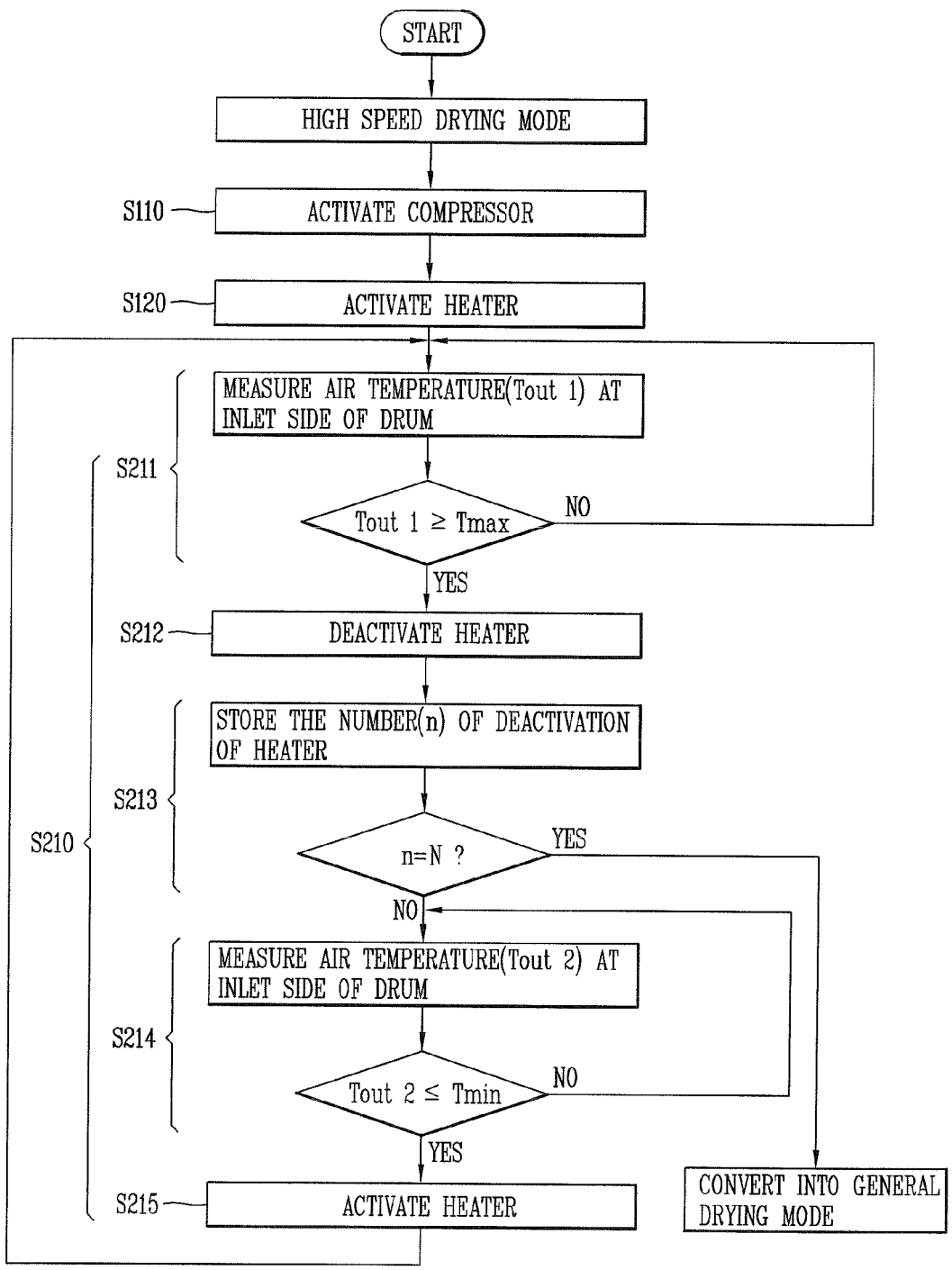

FIG. 23 shows an example of controlling the temperature of the drum by measuring the temperature of the air introduced into the drum.

As shown in FIG. 23, the controller may determine whether or not the measured air temperature Tin1 is within the preset temperature range Tmin~Tmax (S211). The preset temperature range may vary depending on a drying course and a drying mode selected by the user according to the type of laundry. This is why the internal temperature of the drum to be maintained may be different according to the type of laundry.

When the temperature Tin1 of the air at the inlet side of the drum reaches the upper limit of the temperature range, the controller may deactivate the heater (S212) to lower the temperature of the air to be supplied into the drum.

The controller may sense the temperature Tin2 of the air at the inlet side of the drum during deactivation of the heater, and determine whether or not the measured temperature reaches the lower limit of the temperature range (S214). When the temperature of the air fails to reach the lower limit of the temperature range, the controller may continuously leave the heater deactivated so as to prevent the increase in the internal temperature of the drum. However, when the temperature of the air reaches the lower limit of the temperature range, the controller may reactivate the heater (S215).

Here, when the temperature Tin2 of the air at the inlet side of the drum continuously fails to reach the lower limit of the temperature range, the heater may be kept deactivated. Hence, the same effect of converting the drying mode into the general drying mode may be obtained. Or, the controller may automatically control the drying mode into the general drying mode after a preset time.

In the meantime, when the deactivation of the heater is repeated by the aforementioned control, the controller may calculate the repetitive number (n) and automatically convert the drying mode into the general drying mode when the calculated repetitive number (n) reaches the preset number of times (N) (S213).

In the general drying mode of the hybrid drying machine, the cooling fan may not be activated in principle except for activating the cooling fan for temperature control of the compressor. Therefore, heat may be accumulated in the compressor and accordingly air introduced into the drum may be overheated.

Also, when the laundry is dried up to an appropriate level and accordingly heat supplied by the heat source is not required any more, the drying machine may execute a cooling process for cooling the laundry to have humidity and temperature appropriate for the user to take the laundry out of the drying machine and wear it immediately. However, there may be a situation that the internal temperature of the drum is not fully cooled only by the cooling process due to accumulated heat in the compressor. Therefore, a drum cooling control may be required.

A drum cooling control (S220) may include deactivating a heat source (S222 to S223), and cooling temperature of the laundry (S224). Here, prior to deactivating the heat source, a process of adjusting (modifying) a remaining drying time may further be executed. That is, the drum cooling control (S220) may further include adjusting the remaining drying time according to a dried level of the laundry accommodated in the drum. The deactivation time point of the heat source may depend on the adjusted remaining drying time.

Figure 24:
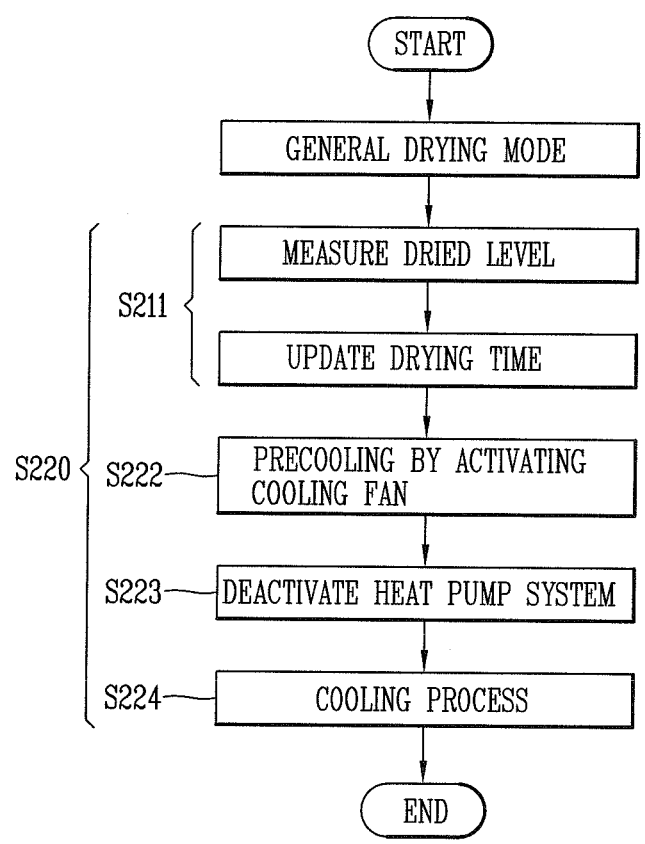
FIGS. 24 and 25 are flowcharts each showing a cooling control for cooling the drum.
Figure 25:
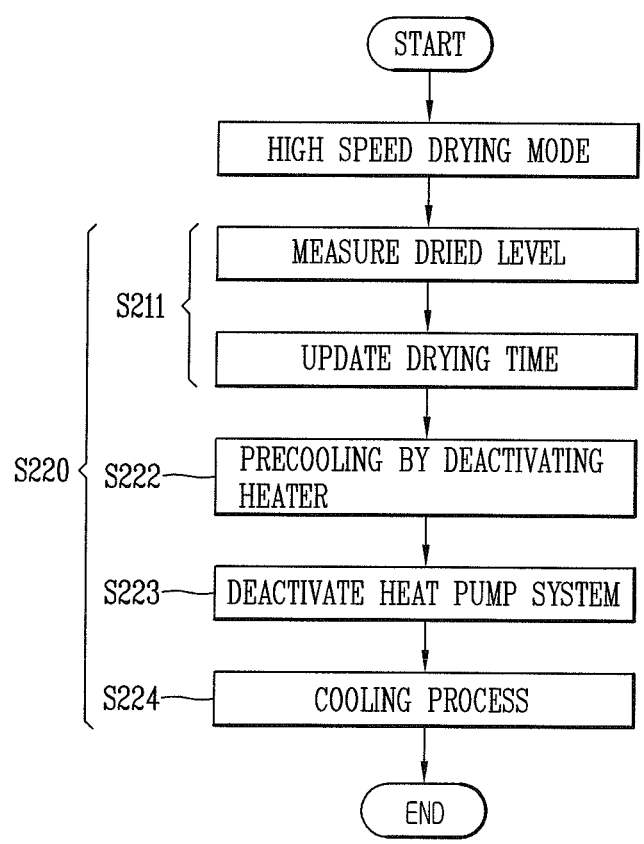

Here, with the difference of the heat source, examples may be considered separately by dividing into the drum cooling control in the general drying mode and the drum cooling control in the high speed drying mode. FIG. 24 shows the cooling control in the general drying mode (S220), and FIG. 25 shows the cooling control in the high speed drying mode (S220).

The heat source deactivation step may include a precooling step (S222) of precooling the temperature of the drum by deactivating the heater or activating the cooling fan, and a cooling entrance step (S223) of entering the cooling step by deactivating the heat pump system.

Referring to FIG. 24, the controller may sense a dried level of the laundry through the humidity sensor installed in the drum. When the dried level of the laundry reaches a preset reference dried level, the controller may update a time required until finishing the drying process including the cooling process (S221).

The controller may activate the cooling fan before a preset time from a finish time point including the cooling process, based on the updated time (S222). This is for precooling the drum by reducing heat accumulated in the compressor prior to entrance into the cooling process. Accordingly, the internal temperature of the drum can be reduced to an appropriate level through the cooling process. The controller may control the cooling fan to operate until the temperature of the air at the outlet side of the drum is fully cooled or until before the drying process enters the cooling process.

Afterwards, the controller may execute the cooling entrance step (S223) of entering the cooling step by deactivating the heat pump system. When the temperature of the air at the outlet side of the drum is fully cooled during the cooling process based on the updated time, the cooling process may be terminated after a preset time, irrespective of the updated time, thereby finishing the drying process. Otherwise, the drying process may be finished based on the updated time.

In the meantime, the cooling fan may be activated in the high speed drying mode, but it may be likely for the internal temperature of the drum to be insufficiently reduced only for an operating time preset for the cooling process. Even in this case, the controller may control the internal temperature of the drum to be fully cooled.

Referring to FIG. 25, the controller may sense a dried level of the laundry through the humidity sensor installed in the drum. When the dried level of the laundry reaches a preset reference dried level, the controller may update a time required until finishing the drying process including the cooling process (S221).

The controller may activate the cooling fan before a preset time from an entrance time point of the cooling process, based on the updated time (S222). When the entrance time of the cooling process fails to meet the preset time based on the updated time, the entrance time point of the cooling process may be updated to the preset time and then the heater may be deactivated.

The controller may execute drying only using the heat pump system as the heat source for the preset time. Afterwards, the controller may deactivate the heat pump system and enter the cooling process (S223). Through the operations, heat accumulated in the compressor may be precooled before entering the cooling process, so as to sufficiently reduce the internal temperature of the drum through the cooling process.

Here, when the temperature of the air at the outlet side of the drum is fully cooled during the cooling process based on the updated time, the cooling process may be terminated after a preset time, irrespective of the updated time, thereby finishing the drying process. Otherwise, the drying process may be finished based on the updated time.

While executing the drying according to the general drying mode and the high speed drying mode, the flow of the refrigerant may also be reduced by reducing the open degree of the expansion valve, in addition to activating the cooling fan or deactivating the heater.

The heat pump system for the hybrid drying machine may include a circuit breaker OLP for forcibly deactivating the compressor to ensure reliability of the heat pump system from the overload of the compressor.

Figure 26:
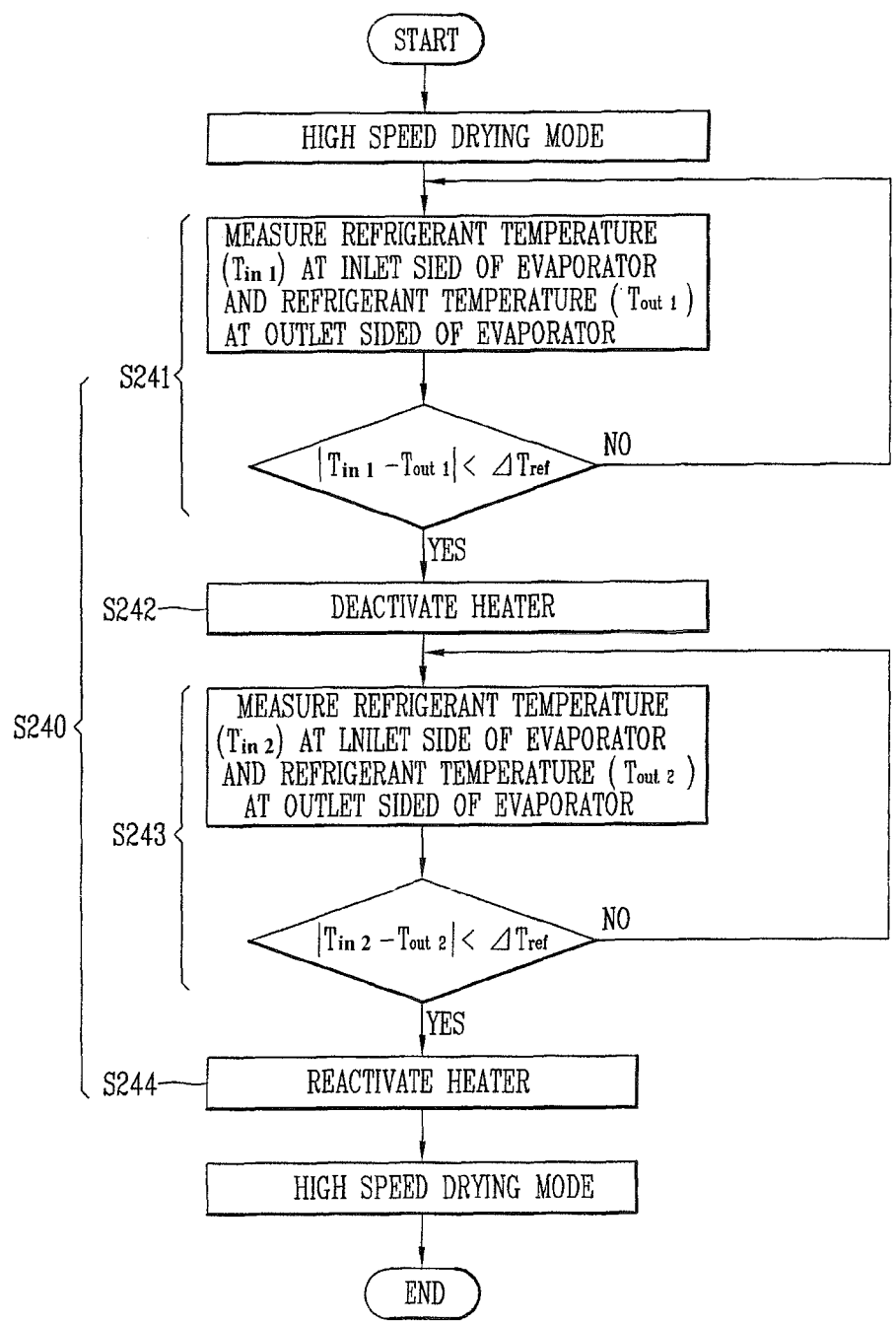
FIG. 26 is a flowchart showing an OLP heater control executed when the compressor of the heat pump system is deactivated.

Therefore, when the compressor is deactivated in response to an operation of the OLP, if the heater still works in the high speed drying mode, there may be a problem in safety of the drying machine. Hence, an OLP heater control (S240) may be required to deactivate the heater when the controller senses the operation of the OLP. FIG. 26 shows the OLP heater control.

Referring to FIG. 26, while executing the drying process in the high speed drying mode of the hybrid drying machine, the controller may execute an OLP operation sensing step (S241). That is, the controller may sense a temperature difference (Tin1−Tout1) between the refrigerant at the inlet side of the evaporator and the refrigerant at the outlet side of the evaporator. When the temperature difference is smaller than a preset minimum difference, the controller may consider it as the OLP of the compressor operating, and accordingly deactivate the heater (S242).

The controller may re-sense the temperature difference between the refrigerant at the inlet side of the evaporator and the refrigerant at the outlet side of the evaporator (S243). The controller may reactivate the heater only when the temperature difference exceeds the preset minimum difference (S244). This is because the controller considers it as the OLP operation of the compressor being finished when the temperature difference exceeds the preset minimum difference.

Meanwhile, the hybrid drying machine may be provided with a steam spraying function. Here, the steam may be generated by a steam generator. The steam generator and the heater may not be used at the same time because both of them cause high power consumption. However, the drum may rotate while the steam is sprayed. Hence, the blowing fan may also operate to make the steam circulating on a circulation channel.

Here, the heater may have a structure of a heating line coupled to an insulator. This may allow the steam circulating on the circulation channel to be condensed around the heating line. The condensed water may be introduced into an internal circuit via the insulator. This may cause an accident due to a leakage current.

Therefore, the controller may activate only the heater for a preset time prior to generation of steam when a start command for a steam spraying process is received. Afterwards, the controller may execute a steam process after deactivating the heater.

Here, the controller may periodically repeat a control operation of stopping the steam generation and activating the heater for a preset time during a steam stroke. Accordingly, the heater may be preheated before the steam flows into the heater. This may allow the steam to be immediately evaporated without being condensed in the heater.

Figure 27:
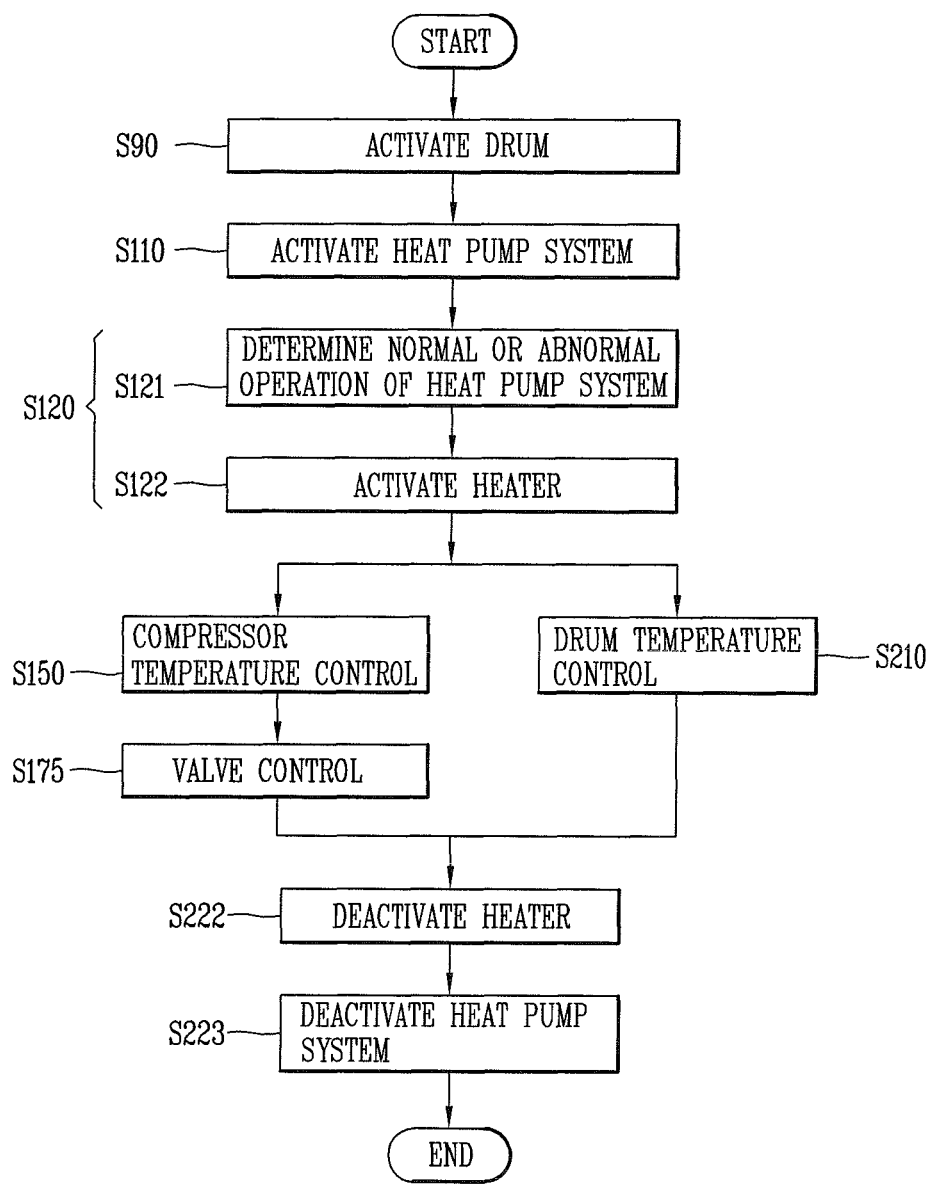
FIG. 27 is a flowchart showing a load activation control based upon activation and deactivation of a heat source.

Those aforementioned control methods for the drying machine may be summarized on the basis of activation and deactivation of the heat source. FIG. 27 is a flowchart showing the sequential steps of controlling the drying machine based on the activation and deactivation of the heat source.

Especially, for the hybrid drying machine using both of the heat pump system and the heater as the heat source, the sequence of activation and deactivation of the heat source may have an important meaning. In addition, the sequence of operating the heat sources may be important in a drying machine having a heat pump system whose heat supply capacity is more than that of the heater because the heat pump system operates as a main heat source.

Referring to FIG. 27, a control method for a drying machine according to one exemplary embodiment may include activating the heat pump system when the heat pump system and the heater are selected as the heat source (S110), activating the heater after the heat pump system operates normally (S120), deactivating the heater to terminate drying by cooling the drum after the drying is done (S222), and deactivating the heat pump system after the heater is deactivated (S212).

Here, the control method may further include driving the driving motor to operate the drum before activation of the heat pump system (S90). The drum operating step may be executed by rotating the driving motor backwardly and forwardly in a sequential manner, and the heat pump system activating step may be started after the forward rotation of the driving motor.

With the configuration, the drum may be driven by the driving motor before the activation of the heat pump system, so as to sequentially run loads. This has been described in detail in the aforementioned load activation control, so more detailed description thereof will be omitted.

In the meantime, the control method may further include determining whether or not a compressor included in the heat pump system normally operates prior to the activation of the heater (S121). The heater activation (S122) may be executed after the normal operation of the heat pump system is checked. The determining step (S121) as to whether or not the compressor normally operates may be achieved by comparing a temperature variation of a refrigerant flowed through the compressor with a preset reference temperature variation.

The control method may further include a compressor temperature control step (S150) of controlling the temperature of the compressor for stability of the heat pump system even after the heater normally works. The compressor temperature control step (S150) may be controlled to repetitively activate and deactivate the heater according to the temperature of the refrigerant flowed through the compressor. The compressor temperature control step (S150) has been described in detail in the aforementioned compressor temperature control, so more detailed description thereof will be omitted.

The control method may further include a valve control step (S175) of controlling an open degree of the expansion valve included in the heat pump system when the temperature of a refrigerant measured while the heater is activated exceeds the upper limit of a preset temperature range or fails to reach the lower limit of the temperature range within a preset time, so as to prevent an overload of the heat pump system.

In the valve control step (S175), the drying may be executed by reactivating the heater according to the temperature of the refrigerant passed through the compressor or only using the heat pump system as the heat source for heating air to be supplied into the drum. The valve control step (175) has been described in detail in the aforementioned compressor reliability ensuring control, so more detailed description will be omitted.

The control method may further include a drum temperature control step (S210) of controlling the temperature of the drum after the heater is activated. In the drum temperature control step (S210), the activation and deactivation of the heater may be repeated according to the temperature of air supplied into the drum or the temperature of air discharged out of the drum, and only the heat pump system may be used as the heat source when the number of deactivation of the heater reaches a preset reference number of times. The drum temperature control step (S210) has been described in detail in the drum temperature control, so more detailed description will be omitted.

The control method may further include determining whether or not a filter through which the air discharged out of drum flows is blocked based on the temperature of air introduced into the drum (S130). In this step, the heater pump system may be deactivated according to whether or not the filter is blocked. The step (S130) of determining whether or not the filter is blocked has been described in detail in the aforementioned filter block control, so more detailed description will be omitted.

Also, the control method may further include re-determining whether or not the filter is blocked according to a temperature difference between the air introduced into the drum and the air discharged out of the drum when a preset time elapses after the heater is activated (S140). Here, whether or not to deactivate the heat source may be decided according to the result of the re-determination as to whether or not the filter is blocked. The step (S140) of re-determining whether or not the filter is blocked has been described in detail in the aforementioned filter block control, so more detailed description will be omitted.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control method for a drying machine including a heat pump system and a heater for heating air to be supplied into a drum, and having a plurality of drying modes using the heat pump system and the heater individually or simultaneously, the method comprising:
   activating the heat pump system when a drying mode using both of the heat pump system and the heater is selected; and
   determining whether or not a filter, through which air discharged out of the drum flows, is blocked according to the temperature of air introduced into the drum after the activating of the heat pump system,
   wherein the heater is activated or deactivated according to whether or not the filter is blocked,
   wherein drying is executed using only the heat pump system as the heat source when a time point that the filter is determined to be blocked is after a predetermined time elapses from a drying start time point.

2. The method of claim 1, wherein the heater is deactivated when the filter is determined to be blocked.

3. The method of claim 1, wherein both of the heater and the heat pump system are activated when the filter is determined to be normal.

4. The method of claim 3, further including:
re-determining whether or not the filter is blocked according to a temperature difference between the air introduced into the drum and the air discharged out of the drum when a predetermined time elapses after both of the heater and the heat pump system are activated, and deciding whether or not to use the heater and the heat pump system according to a result of the re-determination.

5. The method of claim 4, wherein the re-determining as to whether or not the filter is blocked is configured to determine that the filter is blocked when the temperature difference between the air introduced into the drum and the air discharged out of the drum is more than a predetermined filter block reference temperature difference.

6. A control method for a drying machine including a heat pump system and a heater as heat sources for heating air to be supplied into a drum, the heat pump system including a compressor, a condenser, an evaporator, and an expansion valve, the method comprising:
activating the heat pump system when a drying mode using both of the heat pump system and the heater is selected;
determining whether or not the compressor of the heat pump system normally operates after the activating of the heat pump system;
deciding whether or not to use the heater according to whether or not the compressor normally operates,
determining whether or not a filter, through which air discharged out of the drum flows, is blocked according to the temperature of air introduced into the drum after the activating of the heat pump system,
wherein the heater is activated or deactivated according to whether or not the filter is blocked,
wherein drying is finished by cooling laundry accommodated in the drum when a time point that the filter is determined to be blocked is before a predetermined time elapses from a drying start time point.

7. The method of claim 6, wherein the heater has a smaller heat supply capacity than the heat pump system.

8. The method of claim 6, wherein the heater is also activated when the compressor normally operates.

9. The method of claim 6, wherein the determining as to whether or not the compressor normally operates includes measuring a temperature variation of a refrigerant flowed through the compressor, wherein the compressor is determined to normally operate when the temperature variation of the refrigerant is more than a predetermined reference temperature variation.

10. The method of claim 6, further including:
measuring the temperature of a refrigerant flowed through the compressor after the heater is activated; and
activating or deactivating the heater according to the measured temperature of the refrigerant.

11. The method of claim 10, wherein the activating or deactivating of the heater includes:
deactivating the heater when the temperature of the refrigerant measured while the heater is activated reaches the upper limit of a predetermined temperature range;
measuring the temperature of the refrigerant flowed through the compressor while the heater is deactivated and determining whether or not the measured temperature is within the predetermined temperature range; and
reactivating the heater when the temperature of the refrigerant measured while the heater is deactivated reaches the lower limit of the predetermined temperature range.

12. The method of claim 6, wherein the drying machine includes a cooling fan to suck external air, and wherein the method further includes:
measuring the temperature of a refrigerant flowed through the compressor after the heater is activated; and
activating or deactivating the cooling fan according to the measured temperature of the refrigerant.

13. The method of claim 12, wherein the activating or deactivating of the cooling fan includes:
activating the cooling fan when the temperature of the refrigerant measured while the heater is activated reaches an upper limit of a predetermined temperature range;
measuring the temperature of the refrigerant flowed through the compressor while the cooling fan is activated and determining whether or not the measured temperature is within the predetermined temperature range; and
deactivating the cooling fan when the temperature of the refrigerant measured while the cooling fan is activated reaches a lower limit of the predetermined temperature range.

14. The method of claim 6, further including:
measuring the temperature of a refrigerant flowed through the compressor after the heater is activated; and
controlling the temperature of the refrigerant to be within an appropriate temperature range by controlling an open degree of the expansion valve of the heat pump system according to the measured temperature of the refrigerant.

15. The method of claim 14, wherein the controlling of the open degree of the expansion valve includes:
a primary valve control step of controlling the open degree of the expansion valve within a predetermined first open degree range; and
a secondary valve control step of controlling the open degree of the expansion valve within a range larger than the first open degree range when the temperature of the refrigerant fails to belong to the appropriate temperature range even through the primary valve control step.

16. The method of claim 6, further including:
measuring the temperature of air supplied into the drum or the temperature of air discharged out of the drum when both of the heat pump system and the heater are decided to be used;
activating or deactivating the heater according to whether or not the measured temperature of the air is within a predetermined temperature range; and
using only the heat pump system as the heat source when a number of times the heater is deactivated reaches a predetermined reference number of times.

17. The method of claim 16, wherein the activating or deactivating of the heater includes:
deactivating the heater when the temperature of the air measured while the heater is activated reaches an upper limit of the temperature range;
measuring the temperature of the air supplied into the drum or the temperature of the air discharged out of the drum while the heater is deactivated and determining whether or not the measured temperature is within the temperature range; and
reactivating the heater when the temperature of the air measured while the heater is deactivated reaches a lower limit of the temperature range.

18. The method of claim 17, wherein only the heat pump system is used when a time, for which the temperature of the air measured while the heater is deactivated fails to reach the lower limit of the temperature range, lasts for more than a predetermined time.

* * * * *